United States Patent
Garcia, Jr. et al.

(10) Patent No.: US 9,495,088 B2
(45) Date of Patent: Nov. 15, 2016

(54) TEXT ENTRY METHOD WITH CHARACTER INPUT SLIDER

(71) Applicant: Alpine Electronics, Inc., Tokyo (JP)

(72) Inventors: Fredrick P. Garcia, Jr., Torrance, CA (US); Shuhei Hayashi, Iwaki (JP)

(73) Assignee: Alpine Electronics, Inc, Tokyo (JP)

( * ) Notice: Subject to any disclaimer, the term of this patent is extended or adjusted under 35 U.S.C. 154(b) by 92 days.

(21) Appl. No.: 14/583,452

(22) Filed: Dec. 26, 2014

(65) Prior Publication Data
US 2016/0188184 A1 Jun. 30, 2016

(51) Int. Cl.
G06F 3/048 (2013.01)
G06F 3/0484 (2013.01)
G06F 3/16 (2006.01)
G06F 3/0488 (2013.01)

(52) U.S. Cl.
CPC ....... G06F 3/04847 (2013.01); G06F 3/04883 (2013.01); G06F 3/16 (2013.01)

(58) Field of Classification Search
CPC ............. G06F 3/04847; G06F 3/0488; G06F 3/04855
See application file for complete search history.

(56) References Cited

U.S. PATENT DOCUMENTS

| | | | | |
|---|---|---|---|---|
| 5,469,540 A * | 11/1995 | Powers, III | ........... | G06F 3/0481 715/203 |
| 5,874,961 A * | 2/1999 | Bates | .................. | G06F 3/04855 715/786 |
| 8,509,854 B2 * | 8/2013 | Kim | ........................ | G06F 3/016 345/168 |
| 8,665,225 B2 * | 3/2014 | Herz | ....................... | G06F 3/044 345/173 |
| 2004/0095262 A1 | 5/2004 | Breukink | | |
| 2006/0036942 A1 * | 2/2006 | Carter | .................... | G06F 3/0485 715/273 |
| 2010/0056221 A1 * | 3/2010 | Park | ........................ | G06F 3/048 455/566 |
| 2010/0251176 A1 | 9/2010 | Fong et al. | | |
| 2011/0032186 A1 | 2/2011 | Genesin et al. | | |
| 2011/0055702 A1 * | 3/2011 | Jakobson | ............ | G06F 17/2288 715/723 |
| 2011/0157046 A1 * | 6/2011 | Lee | ........................ | G04G 21/08 345/173 |
| 2011/0221685 A1 | 9/2011 | Lee et al. | | |
| 2011/0302534 A1 * | 12/2011 | Ooguchi | ............. | G06F 3/04886 715/830 |
| 2012/0174041 A1 | 7/2012 | Queru | | |
| 2013/0024809 A1 * | 1/2013 | Voonna | ................. | G06F 3/0233 715/786 |
| 2013/0298080 A1 | 11/2013 | Griffin et al. | | |
| 2014/0351760 A1 * | 11/2014 | Skory | ................... | G06F 3/0485 715/830 |

FOREIGN PATENT DOCUMENTS

| | | |
|---|---|---|
| EP | 2341420 A1 | 7/2011 |
| EP | 2549363 A2 | 1/2013 |
| JP | 2004-139321 | 5/2004 |
| WO | WO 2010/110999 | 9/2010 |

* cited by examiner

*Primary Examiner* — Omar Abdul-Ali
(74) *Attorney, Agent, or Firm* — Muramatsu & Associates

(57) ABSTRACT

A method of receiving text entries on a display of an infotainment system including a character input slider that has a slider controller, includes sensing gesture as the slider controller is moved, moving the slider controller along the character input slider in a direction of a sensing result when the gesture is in proximity with the slider controller along the character input slider, presenting one character when the slider controller is in a proximity with a location related to the one character on the character input slider, focusing the one character when the gesture regarding moving the slider controller is not detected for a predetermined period of time, selecting the one character when a predetermined gesture other than the gesture is detected after focusing the one character, and entering the selected one character into an active location of an active text input field.

20 Claims, 25 Drawing Sheets

(a)          (b)

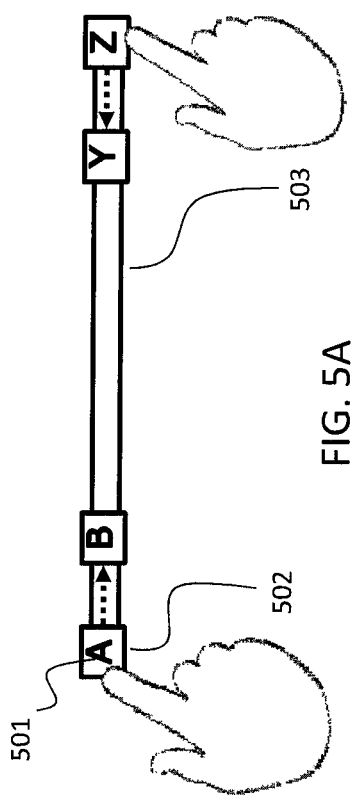
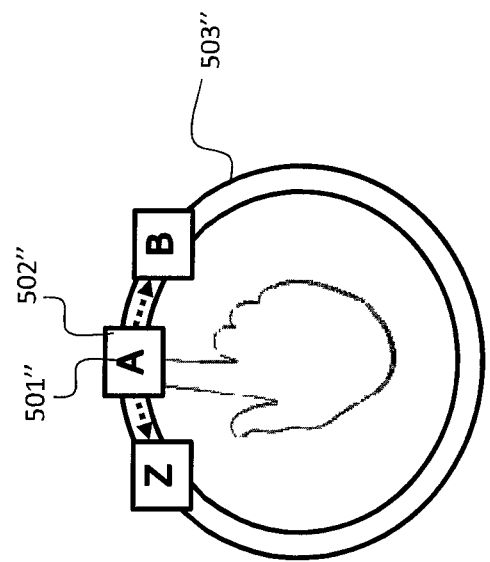
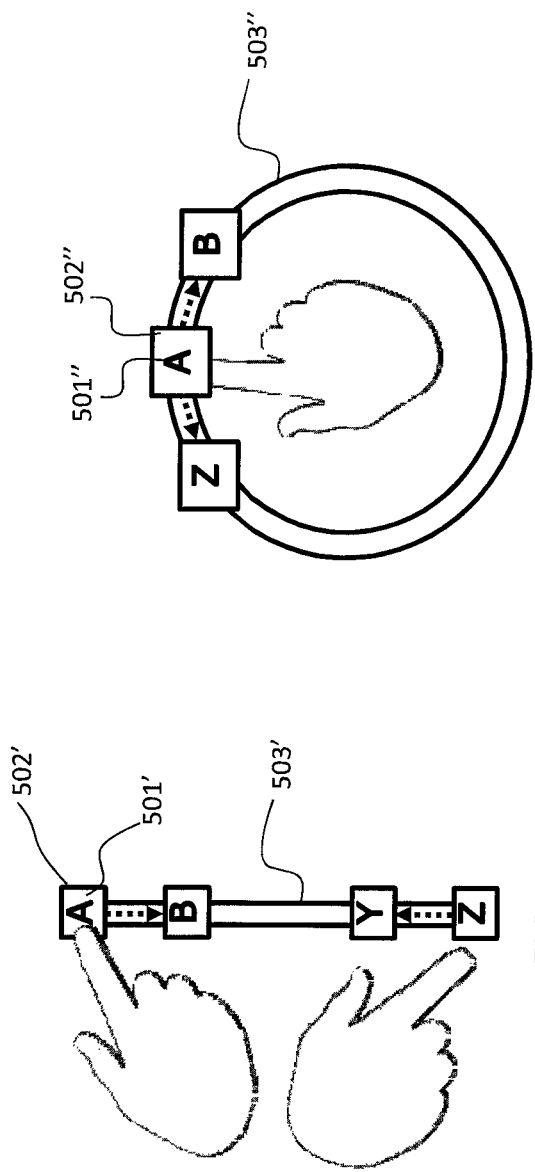
FIG. 5A
FIG. 5B
FIG. 5C

TEXT ENTRY METHOD WITH CHARACTER INPUT SLIDER

BACKGROUND

1. Field

The present disclosure relates to a method and system for entering text on a touch screen. More specifically, embodiments in the present disclosure relate to a method and system of receiving text entries on a touch screen from a user in a vehicle while the user is driving the vehicle.

2. Description of the Related Art

Entering text in a touch screen text field while driving can be cumbersome. This type of gesture requires many repeated glances at a keyboard on the touch screen in order to find a correct key corresponding to a target character to be entered and to make sure the target key is tapped correctly. It takes a long time to scroll long lists of items on the touch screen while driving because it is not easy to confirm contents in the list because of limited time for viewing the list as well as instability in scrolling actions in a vehicle in motion with vibration. Even when a method is provided to scroll quickly to items with a particular first letter, if there are many items with the same first letter, the entry of text still takes a long time and many glances due to driving in order to scroll through the items and to find the desired item. This problem may be alleviated if a keyboard on the screen is fully enlarged. However, when the touch screen keyboard takes up an entire screen, it is impossible to display an updated list of items that matches the entered text while text is being entered.

For smooth and speedy character input for portable devices, several methods have been proposed. For example, patent literature US 2010/0251176 A1 suggests a touch display and a virtual keyboard visually presented by the touch display where the virtual keyboard includes one or more slider buttons and each slider button includes a plurality of touch-selectable items. However, merely showing a whole set of character keys in the virtual keyboard does not solve the above problem that the touch screen keyboard tends to takes up a considerable space in the touch screen because it is still necessary for a user who is also a driver to gaze the screen for a character of potential entry which is relatively small space in the screen in order to confirm the content for entry. Thus, there is a need for more accurate text input method for the driver while a vehicle is in action and the driver has limited time to focus on the screen.

Accordingly, there is a need to provide a better method and system of inputting text on a touch screen without closely looking. A better method of entering text is desired which enables moving through long lists of items on a touch screen quickly including a touch screen search method that allows text entry while displaying a list of matching items that change as text is entered.

SUMMARY

In one aspect, a method of receiving text entries on a display of an infotainment system is provided. The display of the infotainment system provides a character input slider that has at least one slider controller. Once gesture related to moving the at least one slider controller is sensed, the at least one slider controller is moved along the character input slider in a direction of a sensing result when the gesture is in proximity with the at least one slider controller along the character input slider. When the slider controller is in proximity with a location which corresponds with one character on the character input slider, the one character is presented out of a plurality of characters having a plurality of corresponding locations different with each other, respectively on the character input slider, and gets focused when the gesture related to moving the at least one slider controller is not detected for a predetermined period of time. When a predetermined gesture other than the gesture related to moving the at least one slider controller along the character input slider is detected after focusing the one character, the one character is selected and entered into an active location of an active text input field.

In another aspect, a computer system which receives text entries is provided. The system includes a screen that displays graphical user interface, a touch panel that has a touch sensor which senses a contact of an object as a touch gesture on the touch panel and causes a signal associated with the location of the contact of the object when it is sensed that the object and the touch panel are in contact, a processor that interprets the touch gesture on the touch sensor based on the signal from the touch sensor. The system provides a character input slider having at least one slider controller and at least one slider button which moves along the character input slider in a direction of movement of the touch gesture when the touch gesture is sensed in proximity with the at least one slider button and the movement of the touch gesture is along the character input slider, presents one character when the slider controller is in proximity with a location which corresponds with the one character on the character input slider where the one character being out of a plurality of characters having a plurality of corresponding locations different with each other, respectively on the character input slider, and focuses the one character when the movement of the touch gesture is not detected for a predetermined period of time. The processor detects a predetermined gesture other than the movement of the touch gesture along the character input slider after focusing the one character as a cue for receiving the one character as a text entry and instructs the screen to display entering the selected one character into an active location of an active text input field.

In one embodiment, the slider controller along the character input slider is located such that the distance between the location of the contact of the object and the character input slider is substantially shortest. Furthermore, a character distance between one character and the next character may increase when the distance between the location of the contact of the object and the character input slider increases.

In another embodiment, there may be a filter-driven mode where the one character is a character within a plurality of possible candidate characters based on a matching result between input candidate strings and one or more characters already entered, once a first character is entered. Furthermore, the matching result may be based on either forward-matching or partial-matching.

In another embodiment, a current location of the slider controller may be provided as auditory feedback related to the current location of the slider controller. For example, the auditory feedback may be associated with a character currently selected on the slider. In another example, the auditory feedback may be associated with a speed of the movement of the touch gesture in the proximity of the slider controller along the slider.

In another embodiment, a shape of the slider may be a rectangle having a longer side in a horizontal direction, a rectangle having a longer side in a vertical direction, a circular tube, or a full or partial tube.

In another embodiment, the predetermined gesture may be either removing the object from the slider controller, tapping the slider controller with the object, or pressing the slider controller with the object.

In one embodiment, receiving text entries is executed at a touch pad having a touch sensor that senses a contact of an object as a touch gesture on the touch panel and to cause a signal associated with the location of the contact of the object when it is sensed that the object and the touch panel are in contact, a character input slider is displayed on a screen which displays graphical user interface where the one character can be presented by displaying the one character on the screen.

In another embodiment, the character input slider is provided at a touch pad coupled to the infotainment system coupled to one or more speakers, and the one character can be presented by playing back a pronunciation of the one character from the one or more speakers.

In another embodiment, the touch pad is a touch screen comprising the screen, where the character input slider is provided by displaying the character input slider on the touch screen, and the one character can be presented by either displaying the one character on the display or playing back a pronunciation of the one character from the one more speakers.

In another embodiment, the character input slider is a physical slider controller coupled to the infotainment system which is also coupled to one or more speakers, and the one character is presented by either displaying the one character on the display or playing back a pronunciation of the one character from the one more speakers.

The above and other aspects, objects and advantages may best be understood from the following detailed discussion of the embodiments.

BRIEF DESCRIPTION OF THE DRAWINGS

FIGS. 5A, 5B and 5C illustrate examples of text input sliders for receiving text entries according to one embodiment.

DETAILED DESCRIPTION OF THE PREFERRED EMBODIMENTS

Various embodiments for the method and system of entering text with a character input slider will be described hereinafter with reference to the accompanying drawings. Unless defined otherwise, all technical and scientific terms used herein have the same meaning as commonly understood to one of ordinary skill in the art to which present disclosure belongs. Although the description will be made mainly for the case where the method and system of entering text with a character input slider, any methods, devices and materials similar or equivalent to those described, can be used in the practice or testing of the embodiments. All publications mentioned are incorporated by reference for the purpose of describing and disclosing, for example, the designs and methodologies that are described in the publications which might be used in connection with the presently described embodiments. The publications listed or discussed above, below and throughout the text are provided solely for their disclosure prior to the filing date of the present disclosure. Nothing herein is to be construed as an admission that the inventors are not entitled to antedate such disclosure by virtue of prior publications.

In general, various embodiments of the present disclosure are related to entering text with a character input slider on a display device. Furthermore, the embodiments may be related to an infotainment system including a display interface device, e.g. a touch screen, in a vehicle where the display interface device allows a user to enter text with a character input slider under a mobile environment where gazing at the display interface device in a stable manner tends to be difficult because attention of the user to the display interface device is limited and the mobile environment is not stable due to vibration.

Figure 1:
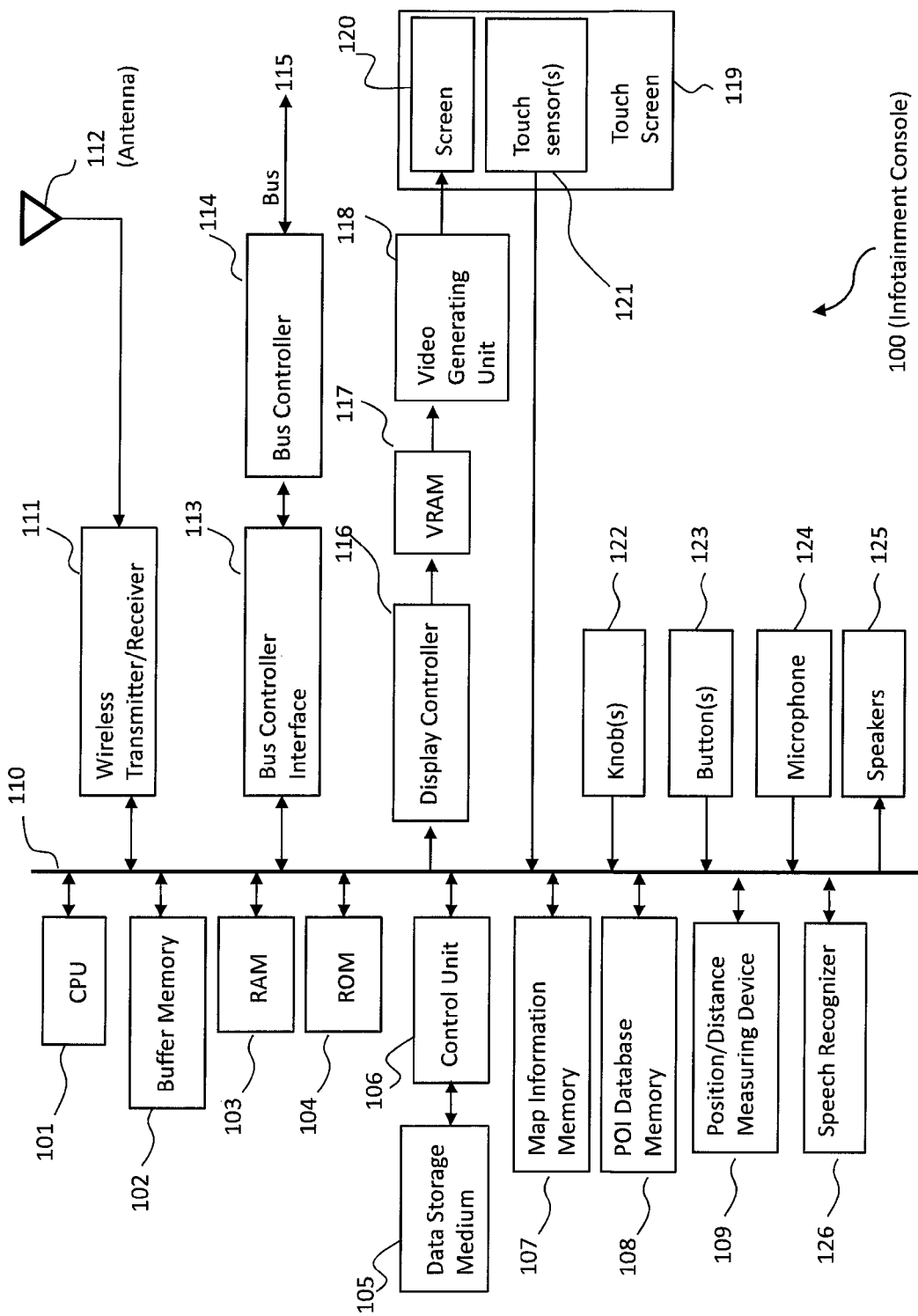
FIG. 1 is a block diagram of an infotainment console in a vehicle including a touch screen having a screen and one or more touch sensors therein, which enables receiving text entries on the touch screen according to some embodiments.

FIG. 1 is a block diagram of an infotainment console in a vehicle including a display interface device that executes a method and system for entering text with a character input slider under a mobile environment according to one embodiment. Note that the block diagram in FIG. 1 is merely an example according to one embodiment for an illustration purpose and not intended to represent any one particular architectural arrangement. The various embodiments can be applied to other type of on-vehicle infotainment system implemented by a vehicle head unit or any mobile infotainment system. For example, the vehicle infotainment console 100 includes a central processor unit (CPU) 101 for controlling an overall operation of the infotainment console, a buffer memory 102 for temporally storing data such as current user interface related data for efficient handling user inputs in accordance with this disclosure, random access memory (RAM) 103 for storing a processing result, and read only memory (ROM) 104 for storing various control programs, such as a user interface control program and an audio visual media and navigation control program, for infotainment system control of this disclosure. The CPU 101 controls an overall operation of the infotainment console 100 including receiving entries of a user, processing the entries, displaying interaction to the user accordingly, selecting a content or control item from either a medium, a connected device, or a broadcast signal and presenting the content or control item to the user.

The infotainment console 100 also includes a data storage medium 105 such as a hard disk in a hard disk drive (HDD), flash memory in a solid state drive (SSD) or universal serial bus (USB) key memory, a compact disc-read only memory (CD-ROM), a digital versatile disc (DVD) or other storage medium for storing navigation and entertainment contents such as map information, music, video etc. . . . . The infotainment console also includes a control unit 106 for controlling an operation for reading the information from the data storage medium 105. The infotainment console 100 may include or have access to a position/distance measuring device 109 in a vehicle and either inside or at proximity of the infotainment console 100, for measuring a present vehicle position or user position, which may be associated with text entries. For example, the position measuring device 109 has a vehicle speed sensor for detecting a moving distance, a gyroscope for detecting moving direction, a microprocessor for calculating a position, a global positioning system (GPS) received for receiving and analyzing GPS signals, etc., and each connected by an internal bus system 110.

The infotainment console 100 may further include a map information memory 107 for storing a portion of the map data relevant to ongoing operations of the infotainment console 100 which is read from the data storage medium 105, a point of interest (POI) database memory 108 for storing database information such as POI information which is read out from the data storage medium 105.

The infotainment console 100 accommodates a plurality of means for receiving user inputs. For example, the infotainment console 100 may include a bus controller 114 for coupling to an external device via an external bus 115 (e.g. Universal Serial Bus, etc.) and a bus controller interface 113 for handling received data from the external device. In one embodiment, the external bus 115 may be a vehicle bus used for receiving user inputs from a vehicle proprietary interface such as buttons or a touch pad on a steering wheel that accepts one or more user touch gesture operations. Furthermore, the infotainment console 100 may include a wireless transmitter/receiver 111. Using the wireless transmitter/receiver 111 via antenna 112, the infotainment console 100 may communicate with external devices inside the vehicle, external devices surrounding vehicles, remote servers and networks, etc.

In one embodiment, the infotainment console 100 includes a touch screen 119 having a screen 120 which may present a natural view as an interface to a user and one or more touch sensors 121 for detecting a touch entry by the user. Alternatively, as seen in a traditional vehicle entertainment system, knobs 122 and buttons 123 may be included in the infotainment console 100 for accommodating entries by a user. To accommodate hands-free input operation to avoid driver distraction, it may be appropriate to use voice commands as user inputs for the infotainment console 100. To accommodate such voice commands, a microphone 124 for receiving speech input may be included.

The vehicle infotainment console 100 may also include a plurality of means to output an interactive result of user input operations. For example, the infotainment console 100 may include a display controller 116 for generating images, such as a character input slider for text entries, as well as menu related images related to the infotainment console control information and some of these generated images may be stored in a video RAM (VRAM) 117. The images stored in the VRAM 117 are sent to a video generating unit 118 where the images are converted to an appropriate format to be displayed on the screen 120 of the touch screen 119. Upon the receipt of video data, the screen 120 displays the image. Alternatively, to keep eyes of a driving user on a road rather than prompting the driving user to look at the screen, the interactive output may be presented to the driving user as audio feedback via one or more speakers 125.

An internal bus system 110 may include one or more busses connected to each other through various adapters, controllers, connectors, etc., and the devices and units of the infotainment console 100 mentioned above may be coupled to each other via the internal bus system 110.

Depending on a context, such as whether the infotainment console 100 is in a navigation mode, entertainment mode, information access mode, control mode, etc., the infotainment console 100 expects a touch operation as an entry from a user. Here, the user's eyes tend to be on a road ahead and around the vehicle that the user is driving, the user can have very short time to pay attention to the screen 119 of the infotainment console 100.

Figure 2A:
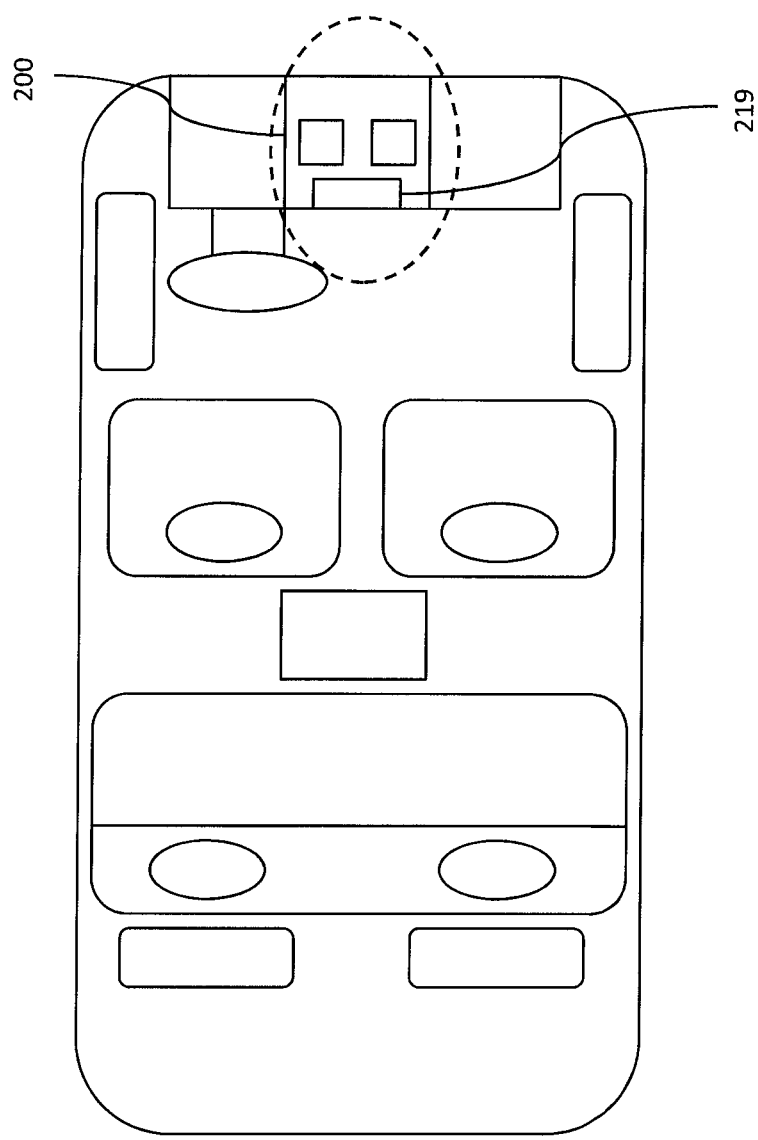
FIG. 2A is a schematic diagram of an infotainment console in a vehicle including a touch screen having a screen and one or more touch sensors therein, which enables receiving text entries on the touch screen, according to one embodiment.
Figure 2B:
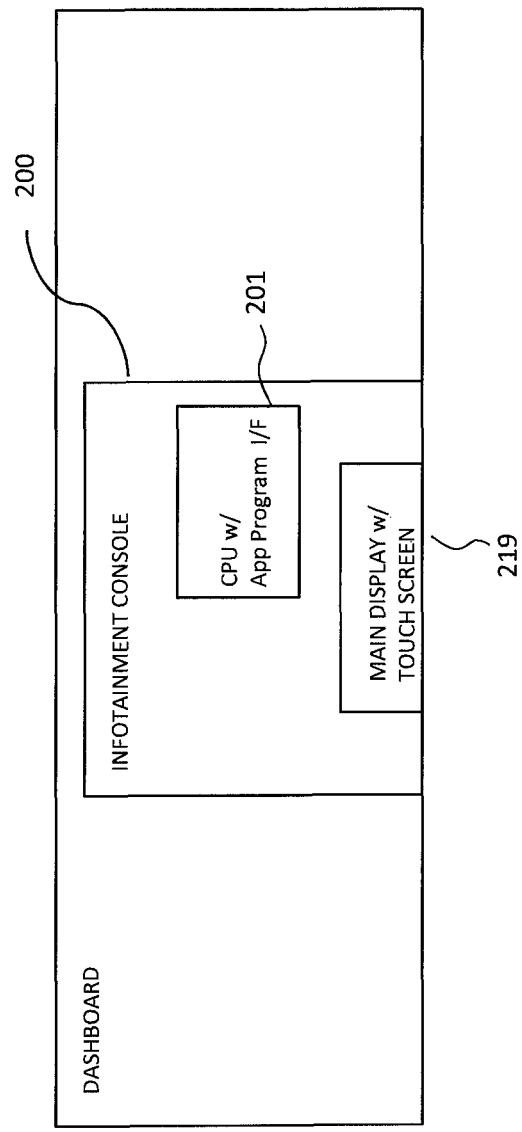
FIG. 2B shows another schematic diagram of an infotainment console in a vehicle including a touch screen having a screen and one or more touch sensors therein, which enables receiving text entries on the touch screen, according to one embodiment.

According to one embodiment, in a vehicle, a main display including a touch screen 219 may be placed in proximity to the user and an infotainment console 200 as shown in FIG. 2A. An application program can be executed by a central processor unit 201 in the infotainment console 200 shown in FIG. 2B for providing service or contents to a user and, an output may be displayed on the main display including the touch screen 219 as a result.

Figure 3:
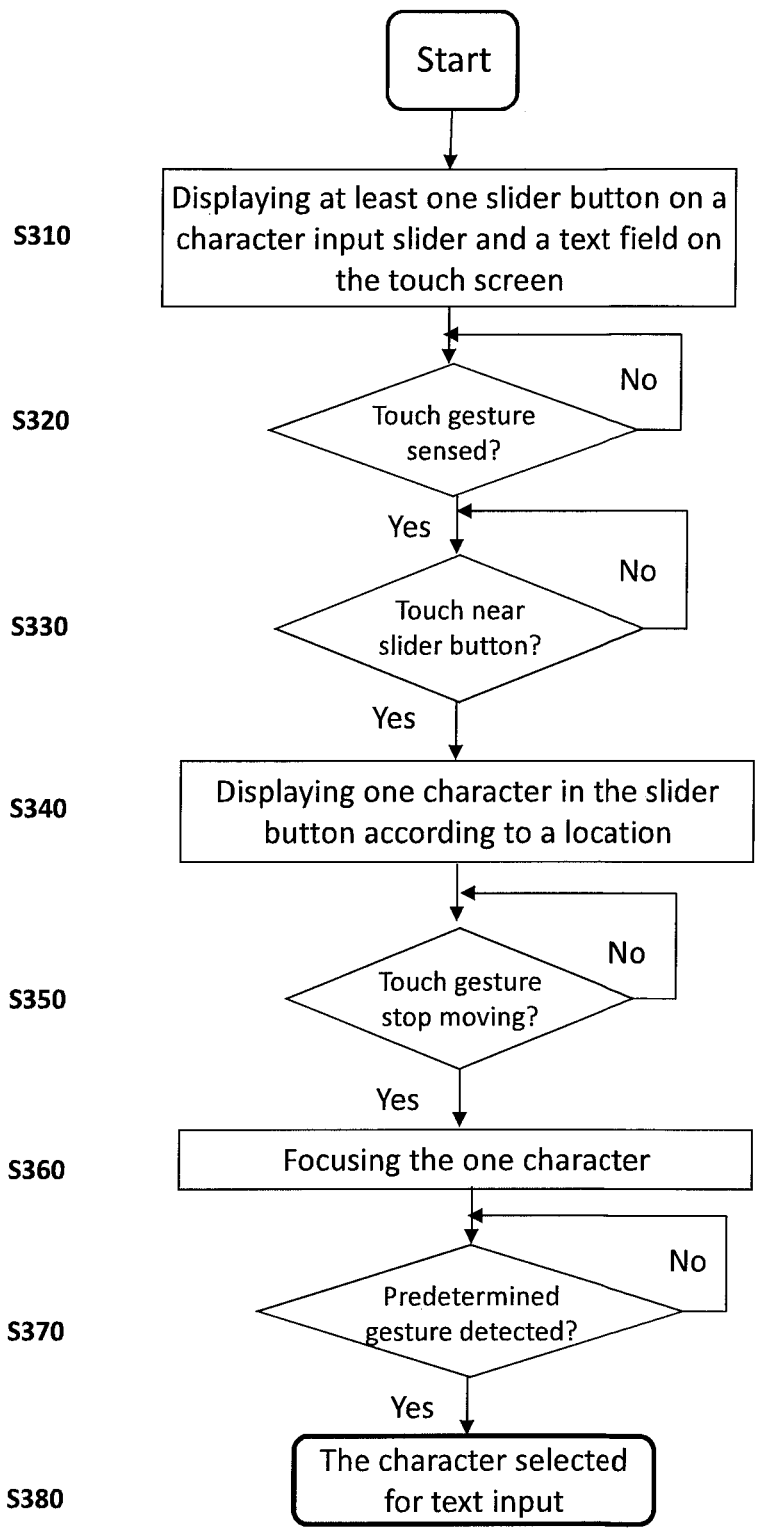
FIG. 3 is a flow chart of receiving text entries having a text input slider for inputting a character and a text field for entering one or more text entries by the text input slider.
Figure 4:
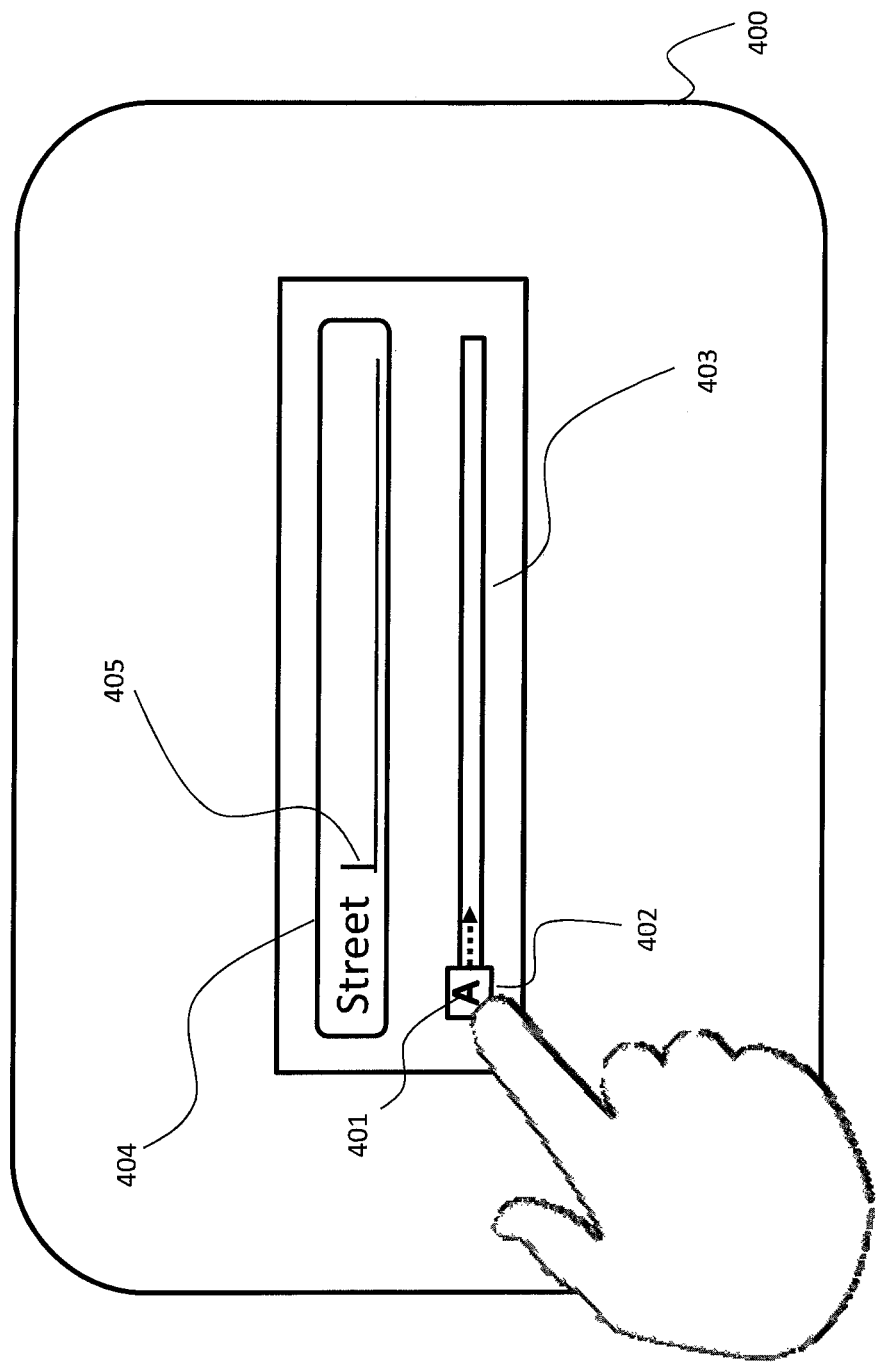
FIG. 4 illustrates an example of a touch screen having a text input slider for inputting a character and a text field for entering one or more text entries by the text input slider.

FIG. 3 shows a flowchart illustrating a method of receiving text entries on a touch screen, according to one embodiment. FIG. 4 shows a screen example illustrating a character input slider for text entries on a touch screen upon touch gesture of a user regarding this embodiment. For example, in FIG. 4, the touch screen 400 is indicating that the user is expected to provide a particular touch gesture for text entry. The touch screen 400 displays a slider button 402, as described in S310 of FIG. 3. Once the touch screen 400 senses a contact of an object, such as a finger of the user as a touch gesture on the touch screen 400 as described in S320, the slider button 402 is displayed on the touch screen 400 so that the slider button 402 moves along a character input slider 403. The slider 402 moves in a direction of movement of the touch gesture when the touch gesture is in a proximity with the at least one slider button and the movement of the touch gesture is along the character input slider as checked at S330. When the slider button is in a proximity with a location on the character input slider 403 which corresponds with the one character, out of a plurality of characters having a plurality of corresponding locations different with each other, respectively on the character input slider 403, the touch screen 400 displays the one character in the slider button 402 as shown at S340. In this example, an alphabet "A" is shown as the one character in the slider button 402. As the slider button 402 moves in the character input slider 403, the one character changes in an alphabetical order so that the user is able to easily guess the one character to be shown next without gazing at the touch screen 400. If the movement of the touch gesture is not detected for a predetermined period of time as illustrated at S350, it is considered that the character input slider 403 is focused on the one character as shown in S360 and the user is interested in entering the one character. The one character is selected as a candidate input character 401 as described at S380 when a predetermined gesture other than the movement of the touch gesture along the character input slider 403 is detected after focusing the one character as shown at S370. The touch screen 400 also displays a text field 404 for showing a string which is a sequence of characters currently being entered. A cursor or a pointer 405 is displayed in the text field 404 in proximity of a current input location for indicating where a current letter is to be entered. The selected candidate input character 401 is entered into the current input location of the text field 404. If there are several text fields in the touch display 400, the active text input field is indicated with the cursor or the pointer 205.

In this example of FIG. 4, the character input slider 403 has a shape of a long horizontal square so that the slider button 402 is configured to move in a horizontal direction. However, the shape of the character input slider is not limited to the square and the direction in which the slider button 402 is moved to change characters can be defined in several different ways. As shown in FIG. 5A, a candidate input character 501 in a slider button 502 changes from "A" to "B" in an ascending alphabetical order when the slider button 502 is moved rightward by a touch gesture moving right along a character input slider 503. If the slider button 502 is moved leftward by the touch gesture moving left along the character input slider 503, the candidate input character 501 in the slider button 502 changes in a descending alphabetical order, such as from "Z" to "Y". FIGS. 5B and 5C are samples of the character input slider in other various shapes. For example, FIG. 5B shows that the character input slider has a shape of a long vertical square so that the slider button is configured to move in a vertical direction. A candidate input character 501' in a slider button 502' changes from "A" to "B" in an ascending alphabetical order when the slider button 502' is moved downward by a touch gesture moving down along a character input slider 503'. If the slider button 502' is moved upward by the touch gesture moving up along the character input slider 503', the candidate input character 501' in the slider button 502' changes in a descending alphabetical order, such as from "Z" to "Y".

In another embodiment, as shown in FIG. 5C, a character input slider 503" has a circular shape and the slider button is configured to move either in a clockwise direction for a candidate input character 501" in a slider button 502" to change in the ascending alphabetical order or a counterclockwise direction to change in the descending alphabetical order. As shown in FIG. 5C, counterclockwise touch gesture while the candidate input character 501" is "A" may cause the alphabet changes from "A" to "Z" and clockwise touch gesture while the candidate input character 501" is "Z" may cause the alphabet changes from "Z" to "A". This type of slider enables a user to move a slider button from the beginning of alphabets to the end of the alphabets, or from the end of the alphabets to the beginning of the alphabets with a concise touch gesture without redundant long touch gesture to move a slider button along a long square slider.

Figure 6:
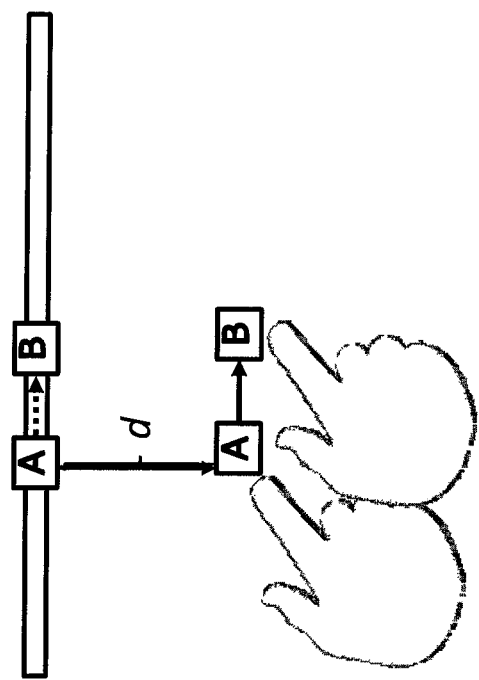
FIG. 6 illustrates an example of a text input slider for receiving text entries on the touch screen according to one embodiment.
Figure 7:
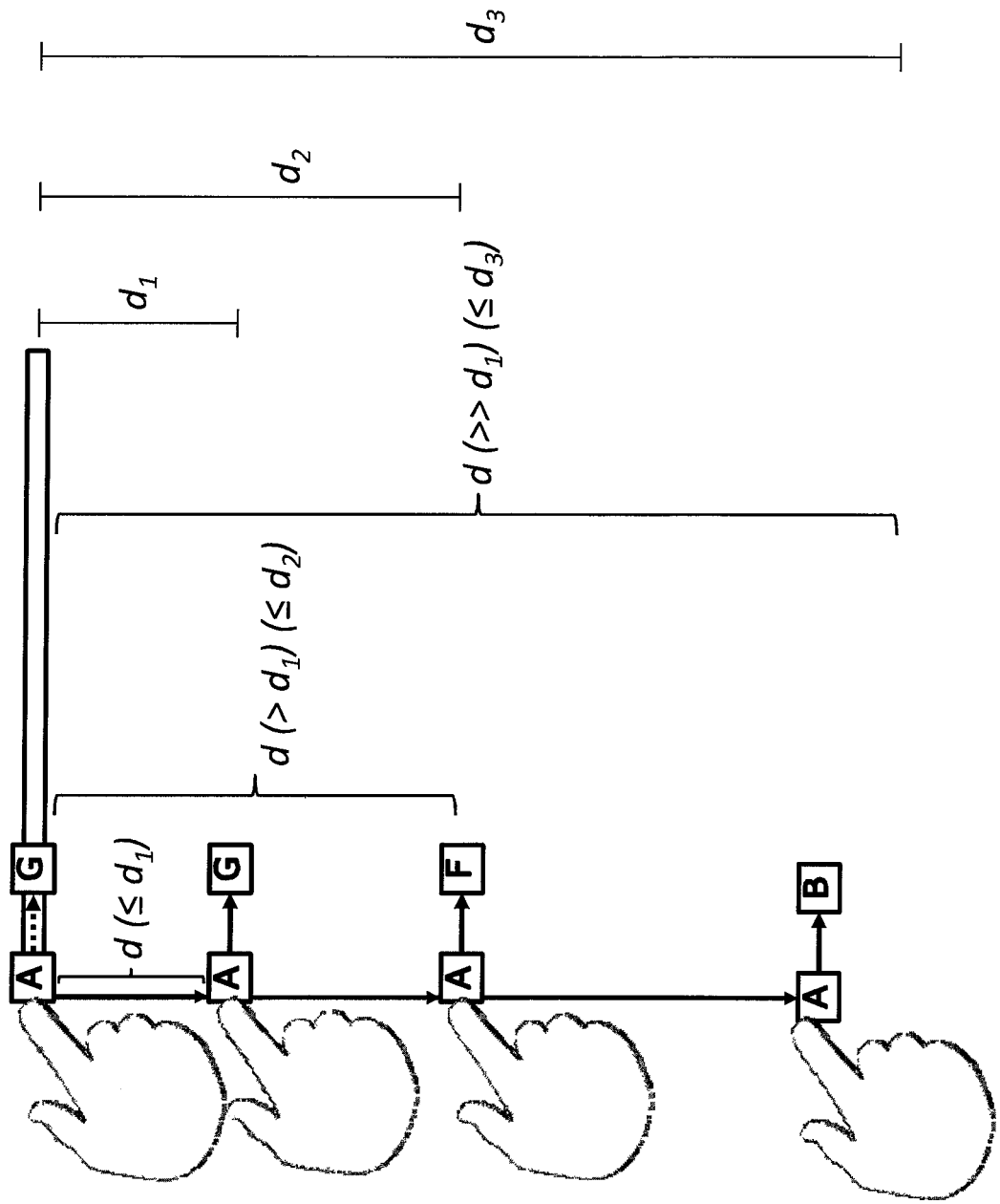
FIG. 7 illustrates an example of a text input slider for receiving text entries on the touch screen according to one embodiment.

In one embodiment, FIG. 6 shows that a rightward sliding gesture with a certain distance from a slider may also cause a candidate input character to change. Here, a touch distance d is defined as a distance between a location of the contact of the object and the slider button becomes substantially shortest. In one embodiment, a distance between candidate input characters change may be controlled by a distance from the character input slider. For example, as shown in FIG. 7, the rightward sliding gesture for a certain length at a distance $d_1$ from the character input slider causes the character to change from "A" to "G" whereas the rightward sliding gesture for the same certain length at a distance $d_2$ from the character input slider causes the character to change from "A" to "F", and the same certain length at a distance $d_3$ from the character input slider causes the character to change from "A" to "B". Thus, a character distance between the one character and next character may be configured to increase when the touch distance d increases.

Figure 8:
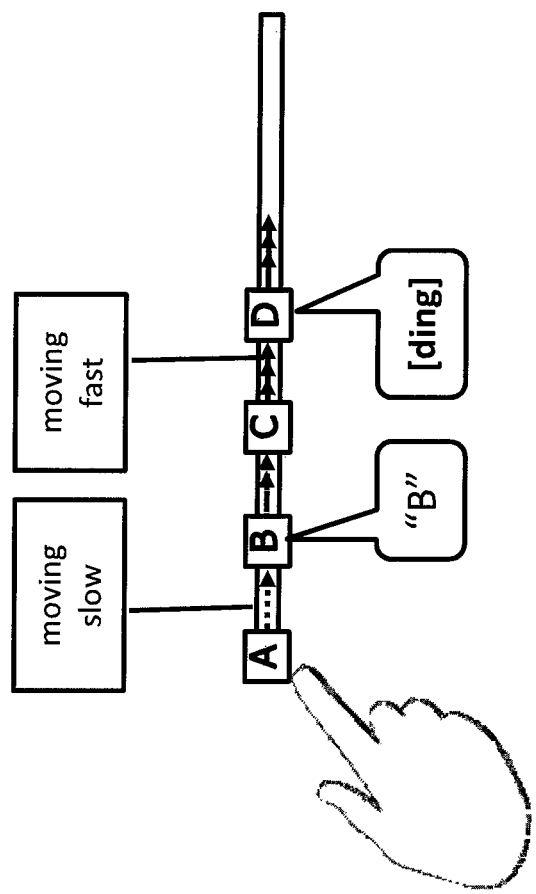
FIG. 8 illustrates an example of touch gesture and audio feedback with regards to a text input slider for receiving text entries on a touch screen according to one embodiment.

In another embodiment, auditory feedback related to a current location of a slider button on a character input slider may be provided. As shown in FIG. 8, a sliding speed change may cause different responses to a user. For example, when a slider button moved by touch gesture passes slowly on a candidate input character "B", auditory feedback of reading out "B" is played back. Thus, the auditory feedback may be associated with a character currently selected or focused on the slider. On the other hand, when the sliding speed is faster than a predetermined speed, a predetermined sound (e.g. "ding") may be played for signaling the user that the slider button is passing on the certain candidate input character. As described above, the auditory feedback may be associated with a speed of the movement of the touch gesture in the proximity of the slider button along the slider.

Figure 9:
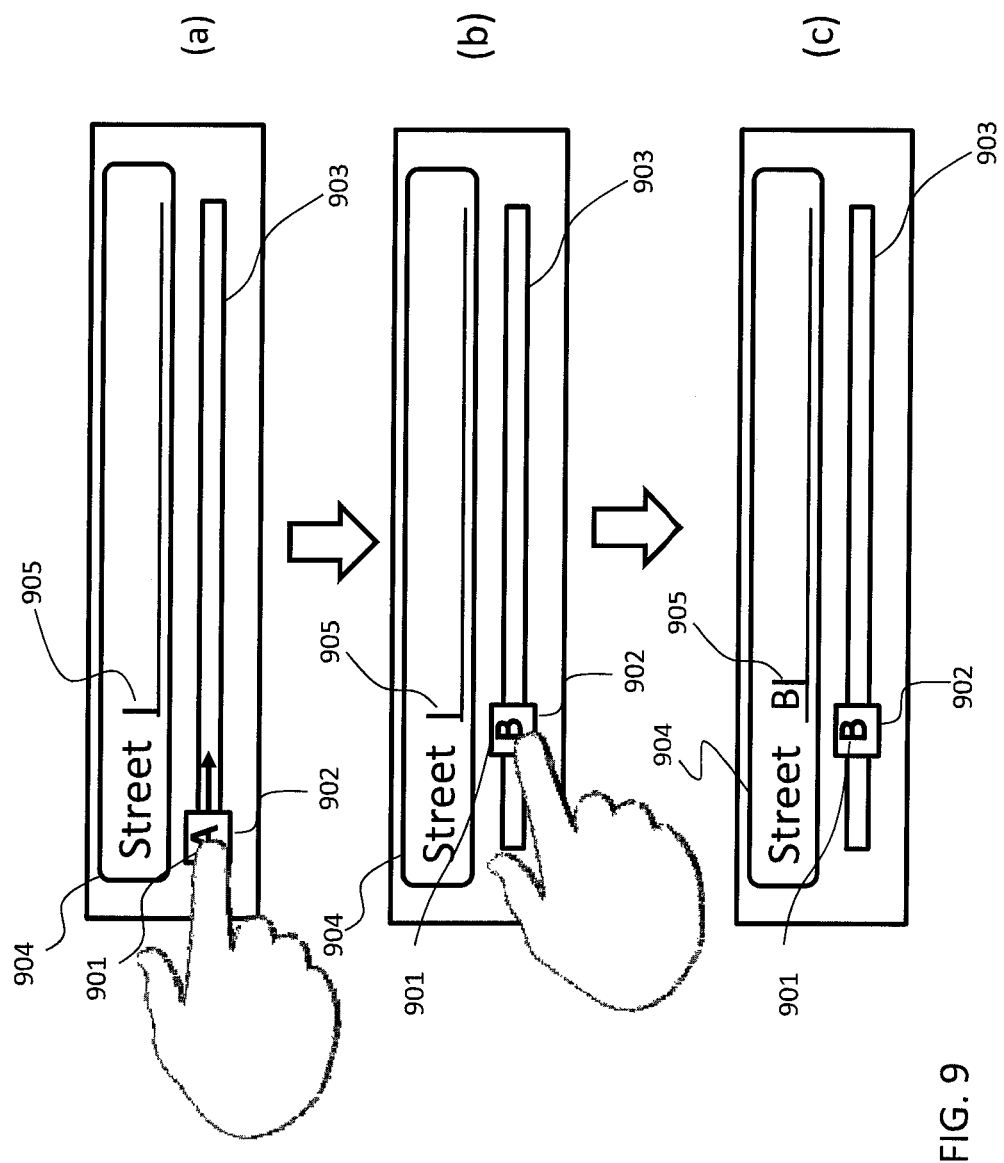
FIGS. 9 (*a*), (*b*) and (*c*) illustrate examples of touch gesture and another gesture with a text input slider for receiving text entries according to one embodiment.
Figure 10:
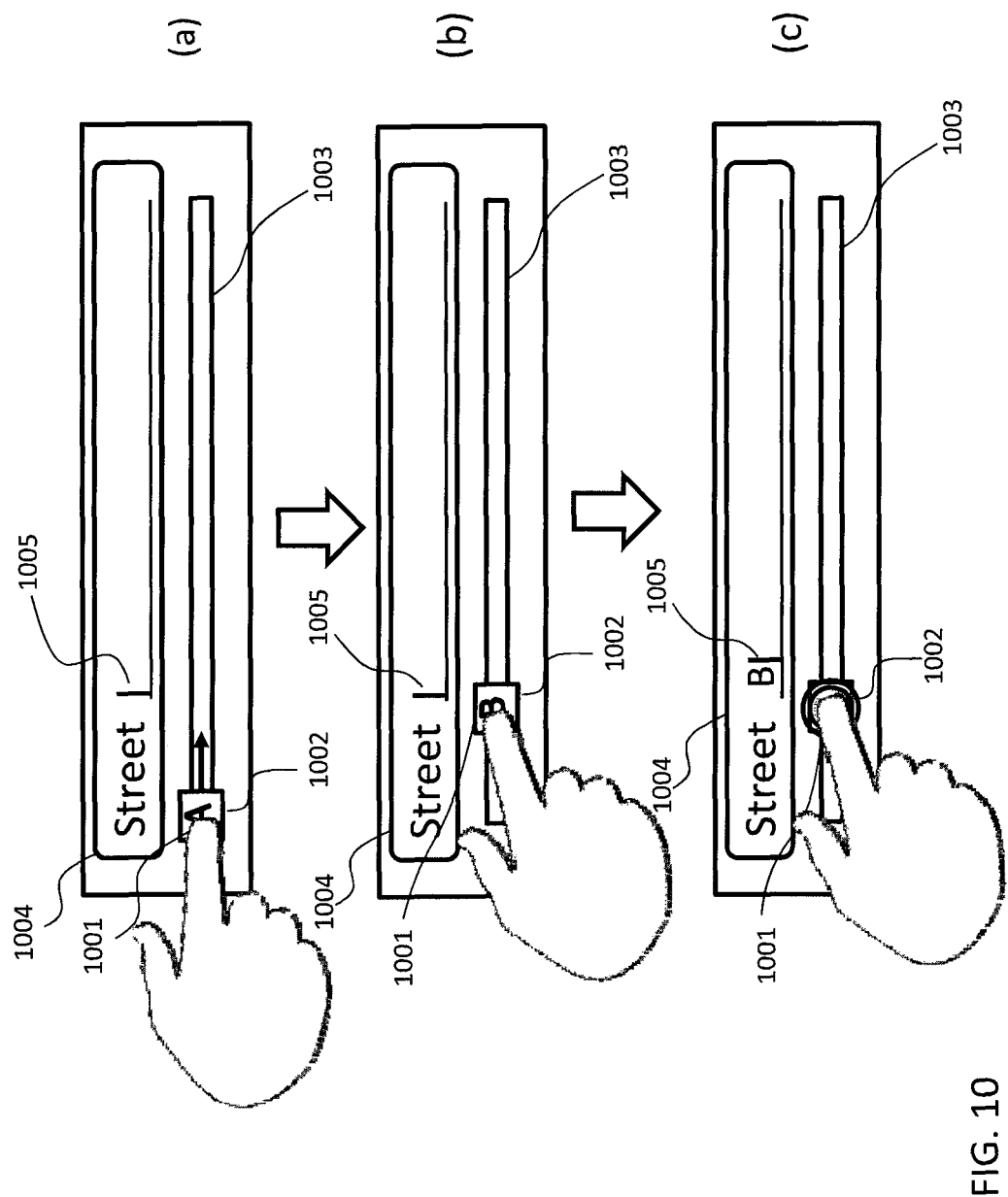
FIGS. 10 (*a*), (*b*) and (*c*) illustrate examples of touch gesture and another gesture with a text input slider for receiving text entries according to one embodiment.

Entering a candidate input character may be executed by any predetermined gesture other than sliding types of touch gesture. In one embodiment, a user may place an object (e.g. finger) for touch gesture on a character input slider 903 and begin sliding rightward as shown in FIG. 9(a). Once the user stops sliding the object for moving a slider button 902, the slider button shows a candidate input character 901 that the slider button 902 is staying on. As illustrated in FIG. 9(b), this example shows that the candidate input character is "B" as shown in the slider button 902. If a user removes the object such as the finger of the user from the touch screen in a predetermined time after stopping the sliding action as shown in FIG. 9(c), the removal of the object from the character input slider is detected and the current candidate input character "B" is selected to be entered. At this point, "B" is also displayed at a cursor 905 in a text field 904. In another embodiment, after stopping the sliding action as shown in FIGS. 10(a) and (b), repetition of alternating contacts and removals of the object such as the finger of the user with regards to a slider button 1002 may be detected a plurality of times within a predetermined period of time if the user taps a slider button 1002 having a candidate input character 1001 the plurality of times as shown in FIG. 10(c). Thus, the plurality of tap actions by the object with regards to a character input slider 1003 may be detected and the current candidate input character "B" is selected to be entered. At this point, "B" is also displayed at a cursor 1005 in a text field 1004. In another embodiment, it is possible to execute an entry of a selected character by pressing a slider button.

Figure 11:
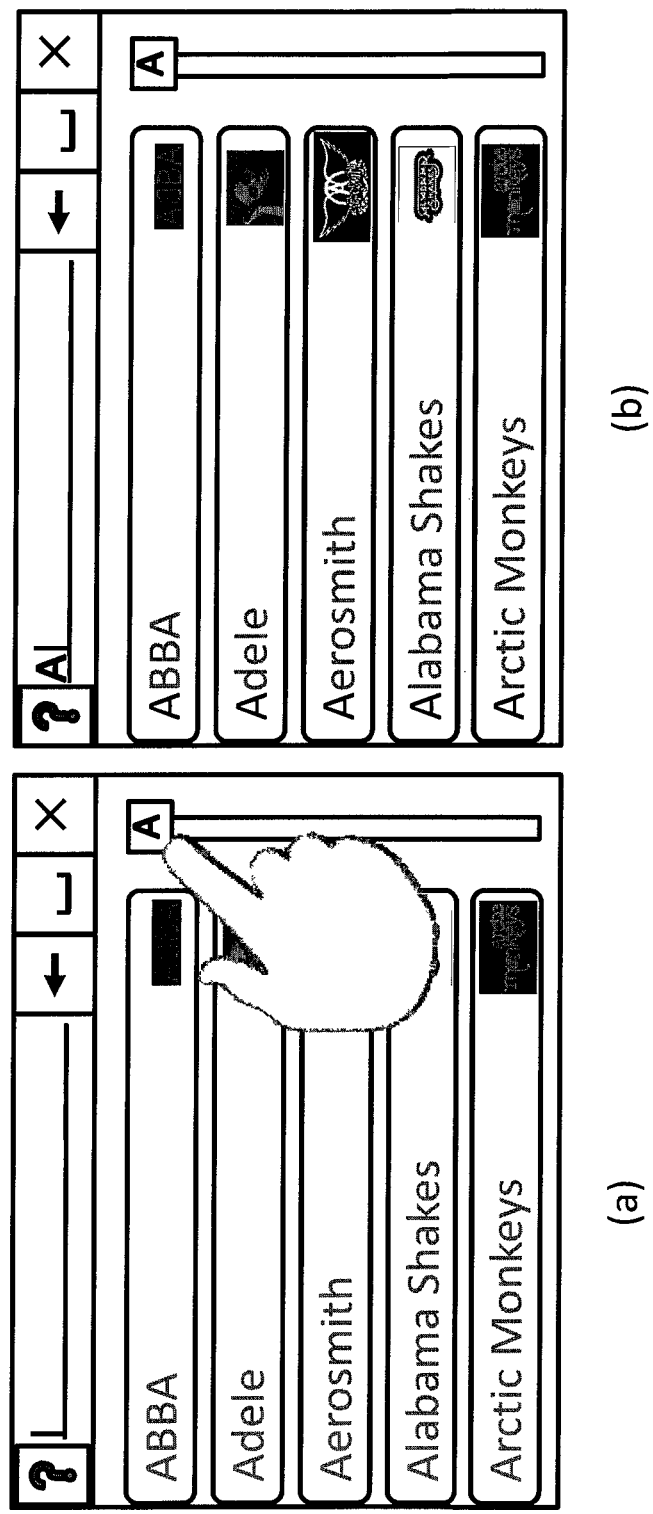
FIGS. 11 (*a*) and (*b*) illustrate examples of touch gesture and another gesture with a text input slider for receiving text entries on a touch screen which lists items for user selection according to one embodiment.

It is possible to use a character input slider for either free text input or filtered text input. In one embodiment, a free text input mode allows any number of characters to be input into a text field. FIGS. 11(a) and (b) illustrate how a database used by a vehicle infotainment system can be searched using free text input with the character input slider. In FIG. 11(a), items in the database are displayed on a touch screen in an alphabetical order. If the touch screen is tapped by making a contact of an object (e.g. finger) and the touch screen, the alphabetical list of items in the database remains displayed because no character has been input into a text field. Once the touch screen senses that the object is removed from a surface of the touch screen at the beginning of the character input slider (e.g. "A"), it is considered that the character "A" is entered into a text field as shown in FIG. 11(b). Upon entering the character into the text field, the character input slider resets back to the top position at the "A" character. The next character entered by a user with the character input slider will be placed in the second position in the text field, or at the new input position marked by the cursor.

Figure 12:
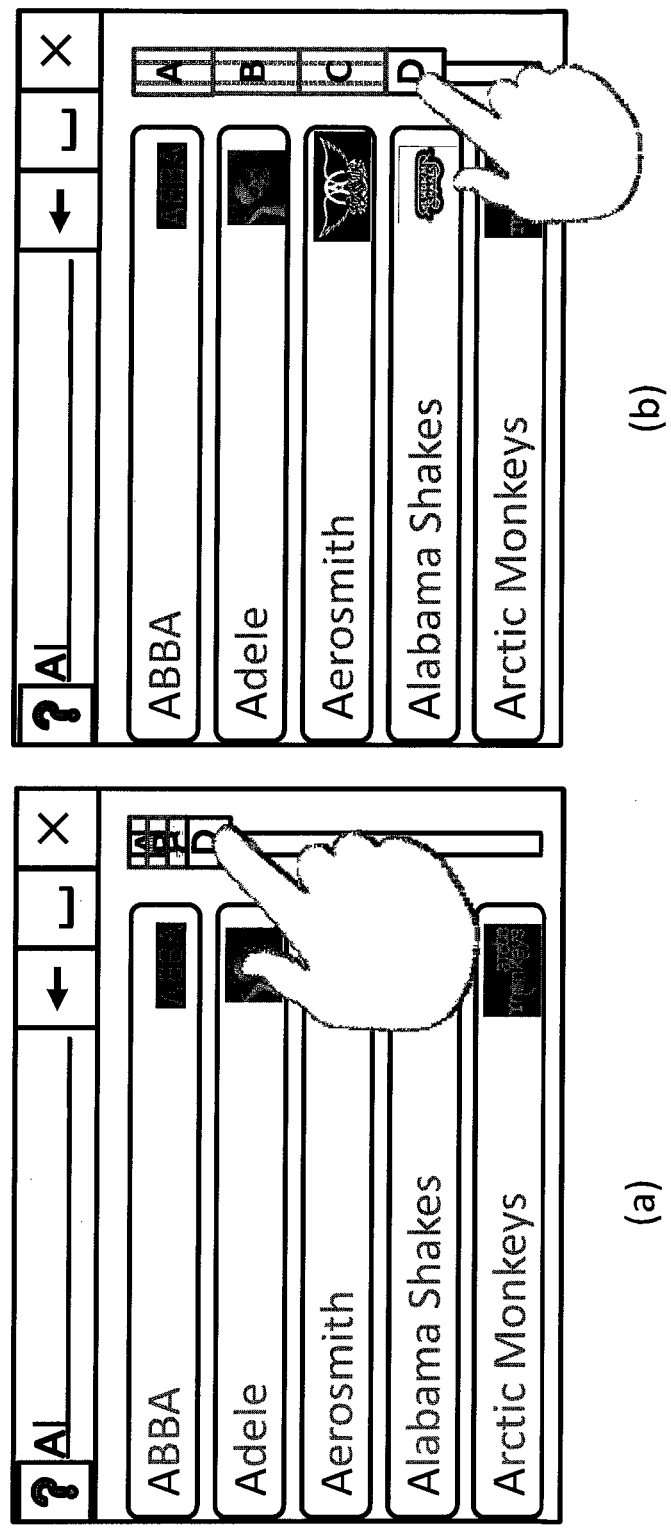
FIGS. 12(*a*) and (*b*) illustrate examples showing speed of touch gesture with a text input slider for receiving text entries on a touch screen which lists items for user selection according to one embodiment.

In another embodiment, it is possible to implement a character input slider that allows an alphabet range of the slider to change depending on a dragging speed. In FIGS. 12(a) and (b), a user has moved a character input slider down to a letter "D". On the way to the letter D, the slider moved through the letters A, B, and C. If the dragging speed of the slider is fast as shown in FIG. 12(a), the character input slider enables the user to move between characters quickly by closely spacing the characters so that the user is able to reach and select a character towards the end of alphabets fast. For example, the last letter "D" can be selected by tapping this letter. On the other hand, if the dragging speed of the slider is slow as shown in FIG. 12(b), the character input slider enables the user to move between characters slowly by widely spacing characters so that the user is able to select a character in the beginning of alphabets easily and deliberately. For example, the first letter "A" can be selected by tapping this letter. By combining these two ways of movements, the user is able to reach anywhere in the alphabets at ease.

Figure 13:
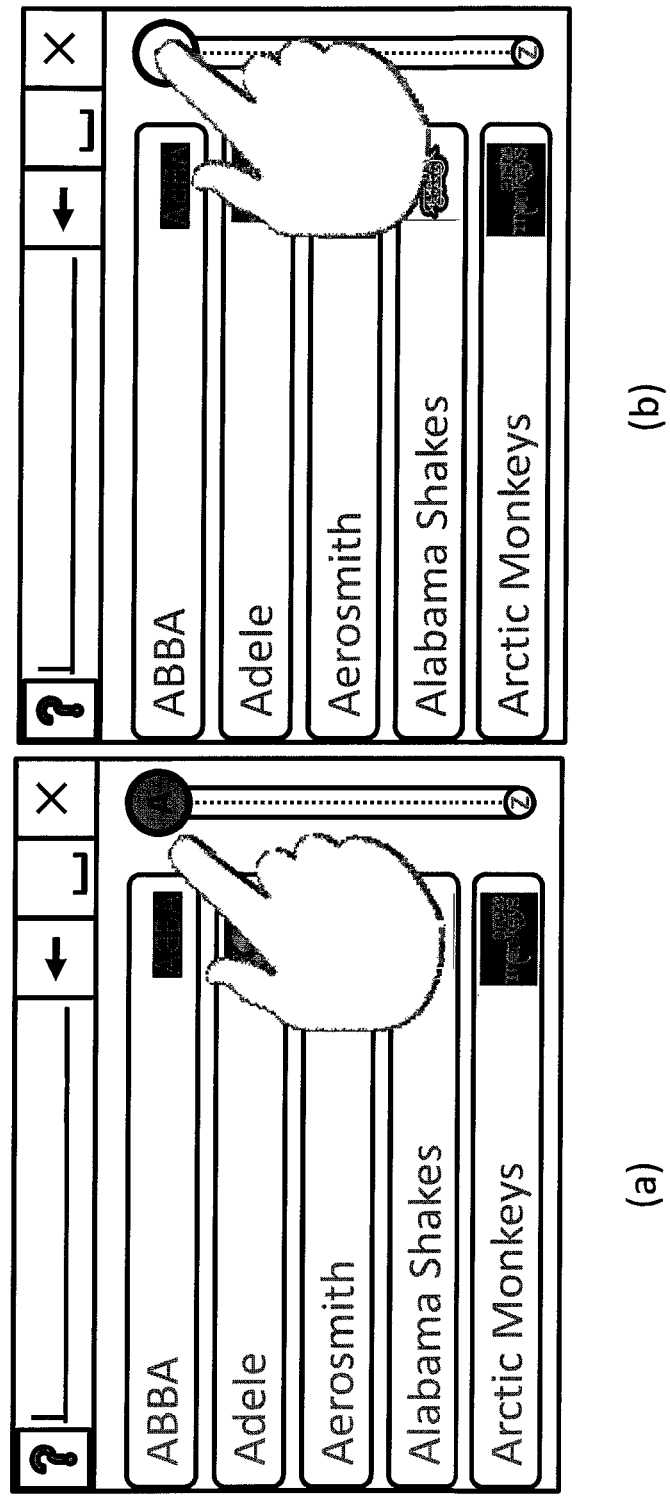
FIGS. 13(*a*)-(*e*) illustrate examples of touch gesture with a text input slider for receiving text entries on a touch screen in a filter-driven mode also displaying items for user selection with according to one embodiment.
Figure 13:
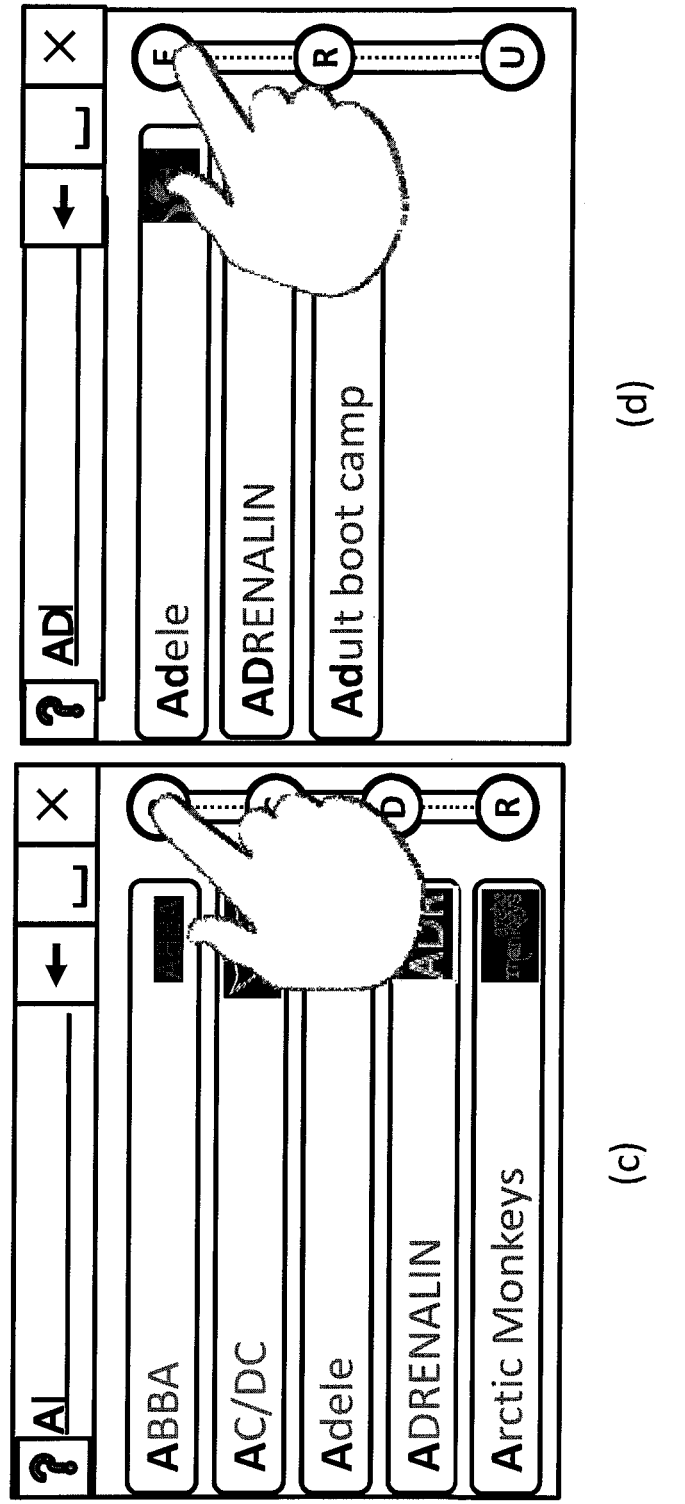
Figure 13:
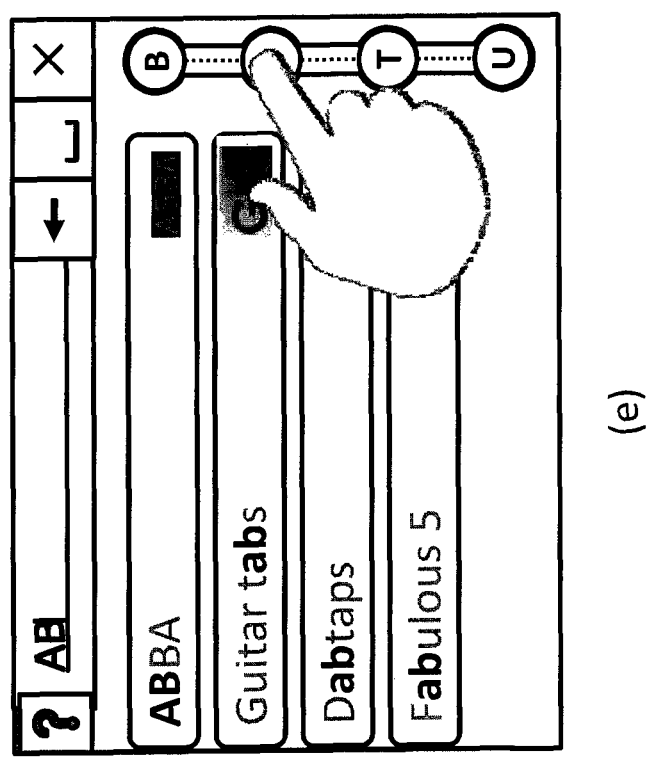

In another embodiment, a "filtered text input" mode limits input characters available at any given input position depending on words in the database that is being searched. As shown in FIG. 13(a), in the filtered text input mode, the information presented on the screen is limited to items with letters that match the letter that the slider is currently positioned on. Additionally, the most likely next character for the search bar can be preselected and highlighted on the slider. Whether the character is most likely next may be determined by frequency of selection and/or number of items (e.g. name of artists, name of albums) or sub-items (e.g. songs) associated with the character, frequency of letter typed, etc. In FIG. 13(a), the most likely next letter is A, thus the letter A is preselected with highlight on the slider and a list of items in the database that start with A are displayed in an alphabetical order.

While a touch screen is in the filtered text input mode and if a slider button is located to "A" as shown in FIG. 13(b), items having "A" in their first characters are extracted. In the screen of FIG. 13(b), a user has tapped and is holding a finger at the beginning of a text slider on the "A". An alphabetical list of items in the database that starts with "A" remains displayed as they were because nothing has been input into a text field. If the user drags the finger along the slider, only letters that correspond to the first character of words available in the database will be represented. For example, if no word in the database starts with a letter "B", "B" will not be included the list of alphabets in the slider for this screen.

Once the finger is removed from the screen of FIG. 13(b), the "A" is entered into the text field. Upon entering the character into the text field, the text slider has changed to reflect the set of available letters for the next character which is shown in a list of characters on a slider as shown in FIG. 13(c), based on the extracted items including "A". Thus, characters that are unavailable to be input at the current input position are excluded in the list of characters on the slider. In FIG. 13(c), the top position now starts at a "B" character instead of starting at the "A" character, because there are no words in the database that is being searched that have an "A" for the first letter and an "A" for the second letter. The next character the user inputs with the text slider will be placed in the second position in the text field, at the new input position marked by the cursor, as shown in FIG. 13(c).

In FIG. 13(d), the user is touching the letter "D" and the list of items has been changed dynamically to that now includes only items in the database that have the letter "D" for their second character. When the user has removed their finger from the screen to input the letter "D" into the text field, upon entering a character into the text field, the text slider has reset back to the top position. The top position now starts at the "E" character because there are no words in the database that is being searched that have an A for the first letter, a "D" for the second letter, and an "A", "B", "C", or "D" for the third letter. The next character the user inputs with the text slider will be placed in the third position in the text field (at the new input position marked by the cursor). Additionally, because there are only a small number of letters available for the next character, all the letters may be displayed in larger fonts on the slider.

One embodiment of receiving text entries on the touch screen in a filter-driven mode is that the one character is a character within a plurality of possible candidate characters based on a forward-matching result between candidate items in a database and one or more characters already entered in a text field, once a first character is entered. However, matching does not have to be limited between items in the database and a letter in a slider. It is also possible to execute matching between items in the database and a string already entered in a text field. Furthermore, the matching does not have to be limited to forward-matching or left-hand matching. In one embodiment, partial matching may be executed between the items in the database and the text string already entered in the text field. As shown in FIG. 13(e), after a plurality of characters "AB" have been entered in a text field, it is possible to list all the items which include "ab", "Ab", "aB" and "AB" searched in a database regardless of their positions and to display the list of items as shown in FIG. 13(e).

Figure 14:
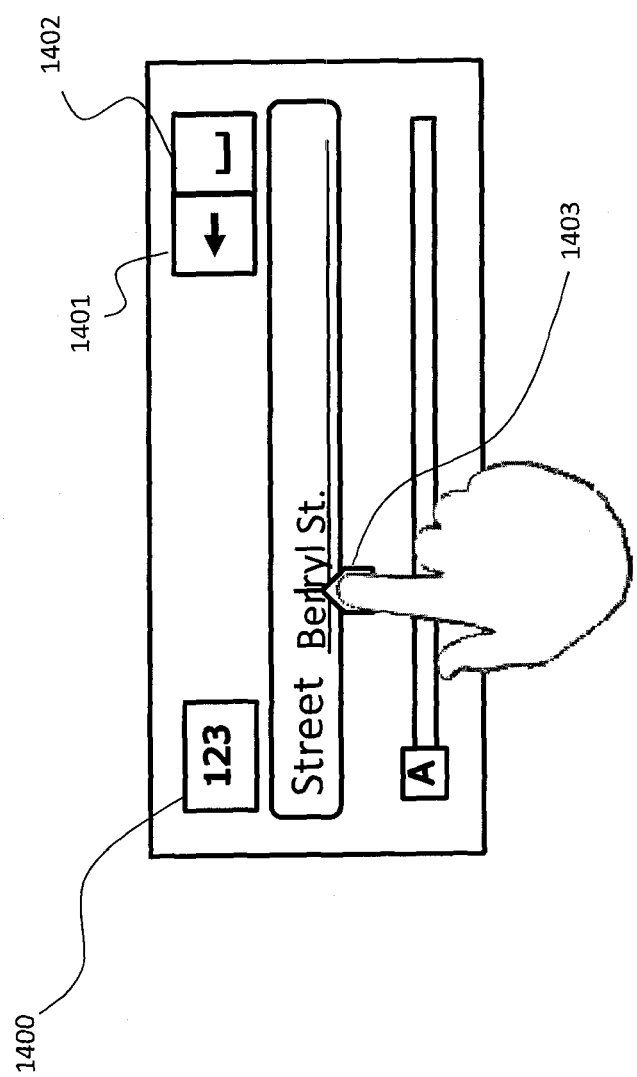
FIG. 14 illustrates examples of additional buttons or input means for a text input slider for receiving text entries according to one embodiment.

According to another embodiment, it is possible to additionally implement buttons or input means that can be used to control a text input field or an input slider. Some examples of such buttons or means that could be used with the above described input methods of text entries on the touch screen are one or more character set switches 1400 in FIG. 14 which can be used for switching between character sets such as an alphabetical character set and a numerical character set, a delete button 1401 which can be used for deleting characters that have been input into the text input field, a space button 1402 which may be used for adding an empty space character in the text input field, and a cursor handle 1403 which enables tapping and dragging in order to move a cursor in the text input field. It is also possible to implement that the cursor handle appears when tapping is detected in proximity of the text input field.

Figure 15:
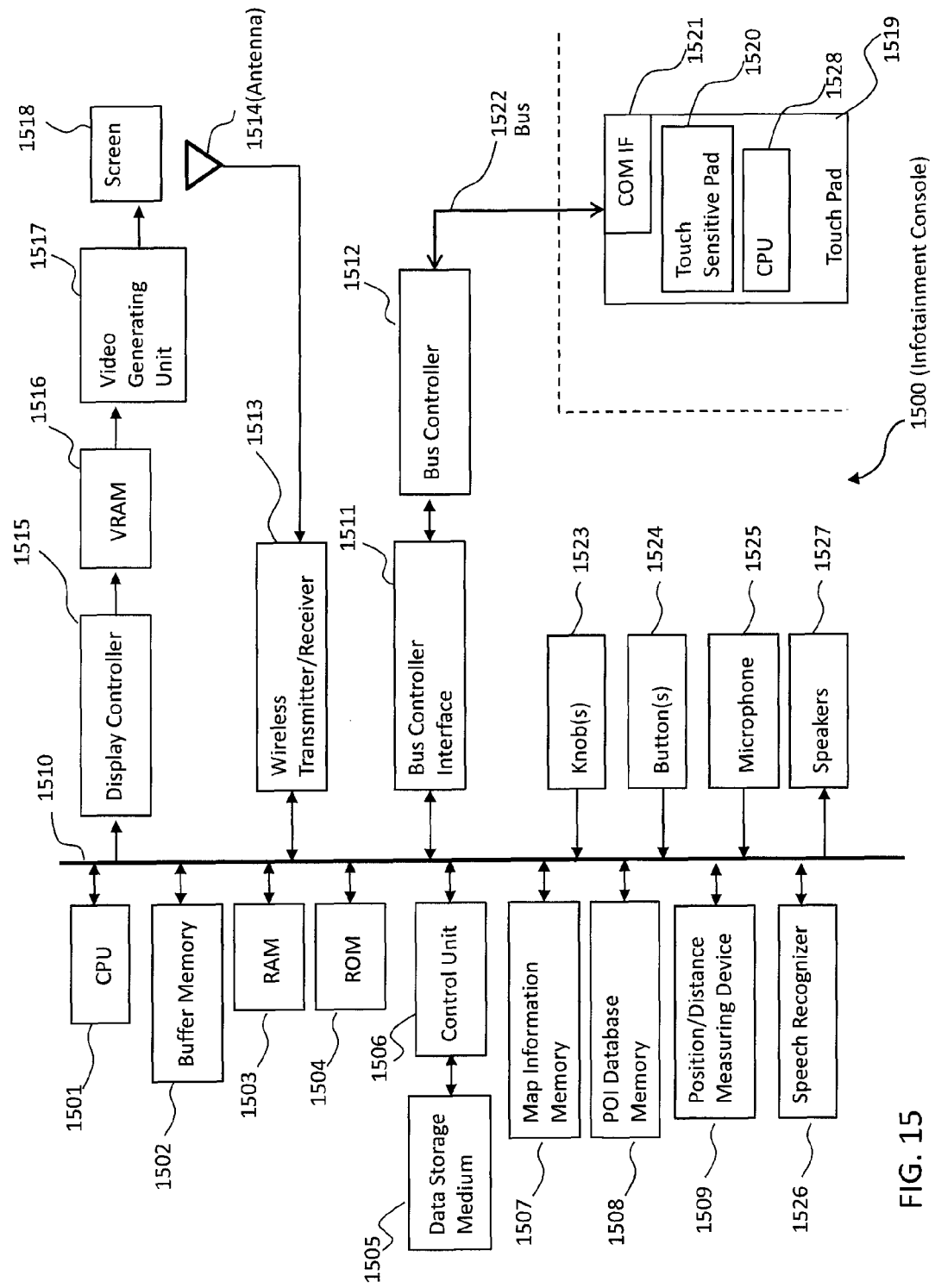
FIG. 15 is a block diagram of an infotainment console in a vehicle and a touch pad having one or more touch sensors therein, which enables receiving text entries on the touch pad according to some embodiments.

FIG. 15 is a block diagram of an infotainment console in a vehicle including a display interface device that executes a method and system for entering text with a character input slider under a mobile environment according to another embodiment. Similar to FIG. 1, the vehicle infotainment console 1500 includes a central processor unit (CPU) 1501, a buffer memory 1502, random access memory (RAM) 1503, and read only memory (ROM) 1504, used for infotainment system control of this disclosure. The CPU 1501 controls an overall operation of the infotainment console 1500 including receiving entries of a user, processing the entries, displaying interaction to the user accordingly, selecting a content or control item from either a medium, a connected device, or a broadcast signal and presenting the content or control item to the user. The infotainment console 1500 also includes a data storage medium 1505 such as a hard disk in a hard disk drive (HDD), flash memory in a solid state drive (SSD) or universal serial bus (USB) key memory, a compact disc-read only memory (CD-ROM), a digital versatile disc (DVD) or other storage medium for storing navigation and entertainment contents such as map information, music, video etc., a control unit 1506 for controlling an operation for reading the information from the data storage medium 1505, a map information memory 1507, a point of interest (POI) database memory 1508, a position/distance measuring device 1509, etc., and each connected by an internal bus system 1510.

The infotainment console 1500 accommodates a plurality of means for receiving user inputs. For example, the infotainment console 1500 may include a bus controller 1511 for coupling to an external device via an external bus 1522 (e.g. Universal Serial Bus, etc.) and a bus controller interface 1512 for handling handles received data from the external device. In one embodiment, the external bus 1522 may be a vehicle bus used for receiving user inputs from a vehicle proprietary interface such as a touch pad 1519 at proximity of a seat or on a steering wheel that accepts one or more user touch gesture operations. Here, the touch pad 1519 includes a central processing unit (CPU) 1528 which processes a touch-driven signal detected at a touch sensitive pad 1520 and handles a communication interface 1521 in order to transmit the detected touch-driven signal to the infotainment console 1500 via the external bus 1522.

Alternatively, as seen in a traditional vehicle entertainment system, knobs 1523 and buttons 1524 may be included in the infotainment console 1500 for accommodating entries by a user. To accommodate hands-free input operation to avoid driver distraction, it may be appropriate to use voice commands as user inputs for the infotainment console 1500. To accommodate such voice commands, a microphone 1525 for receiving speech input may be included. Furthermore, the infotainment console 1500 may include a wireless transmitter/receiver 1513. Using the wireless transmitter/receiver 1513 via antenna 1514, the infotainment console 1500 may communicate with external devices inside the vehicle, external devices surrounding vehicles, remote servers and networks, etc. Thus, it may be possible to connect another touch device such as a smartphone (not illustrated) to the infotainment console 1500 in one embodiment so that one or more user touch gesture operations may be accepted from a touch screen of the smartphone.

The vehicle infotainment console 1500 may also include a plurality of means to output an interactive result of user input operations. For example, the infotainment console 1500 may include a display controller 1515 for generating images, such as a character input slider for text entries, as well as menu related images related to the infotainment console control information and some of these generated images may be stored in a video RAM (VRAM) 1516. The images stored in the VRAM 1516 are sent to a video generating unit 1517 where the images are converted to an appropriate format to be displayed on a screen 1518. Upon the receipt of video data, the screen 1518 displays the image. Alternatively, to keep eyes of a driving user on a road rather than prompting the driving user to look at the screen, the interactive output may be presented to the driving user as audio feedback via one or more speakers 1527.

Depending on a context, such as whether the infotainment console 1500 is in a navigation mode, entertainment mode, information access mode, control mode, etc., the infotainment console 1500 expects a touch operation as an entry from a user. Here, the user's eyes tend to be on a road ahead and around the vehicle that the user is driving, the user can have very short time to pay attention to the screen 1518 of the infotainment console 1500.

Figure 16A:
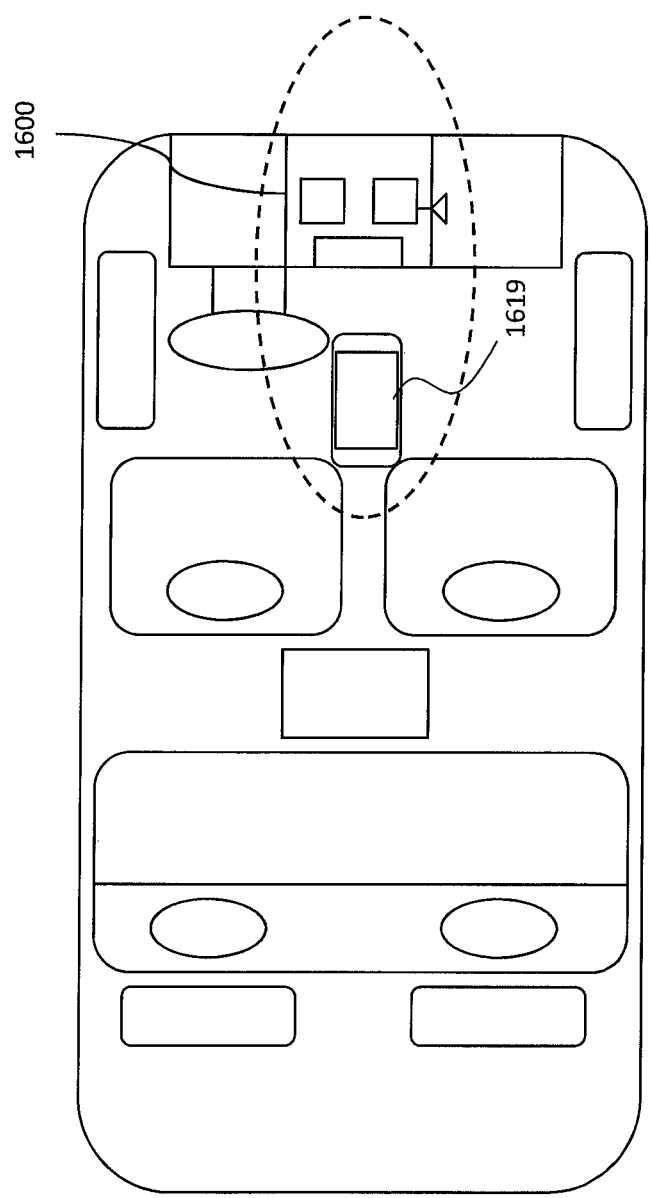
FIG. 16A is a schematic diagram of an infotainment console in a vehicle and a touch pad having one or more touch sensors therein, which enables receiving text entries on the touch pad, according to one embodiment.
Figure 16B:
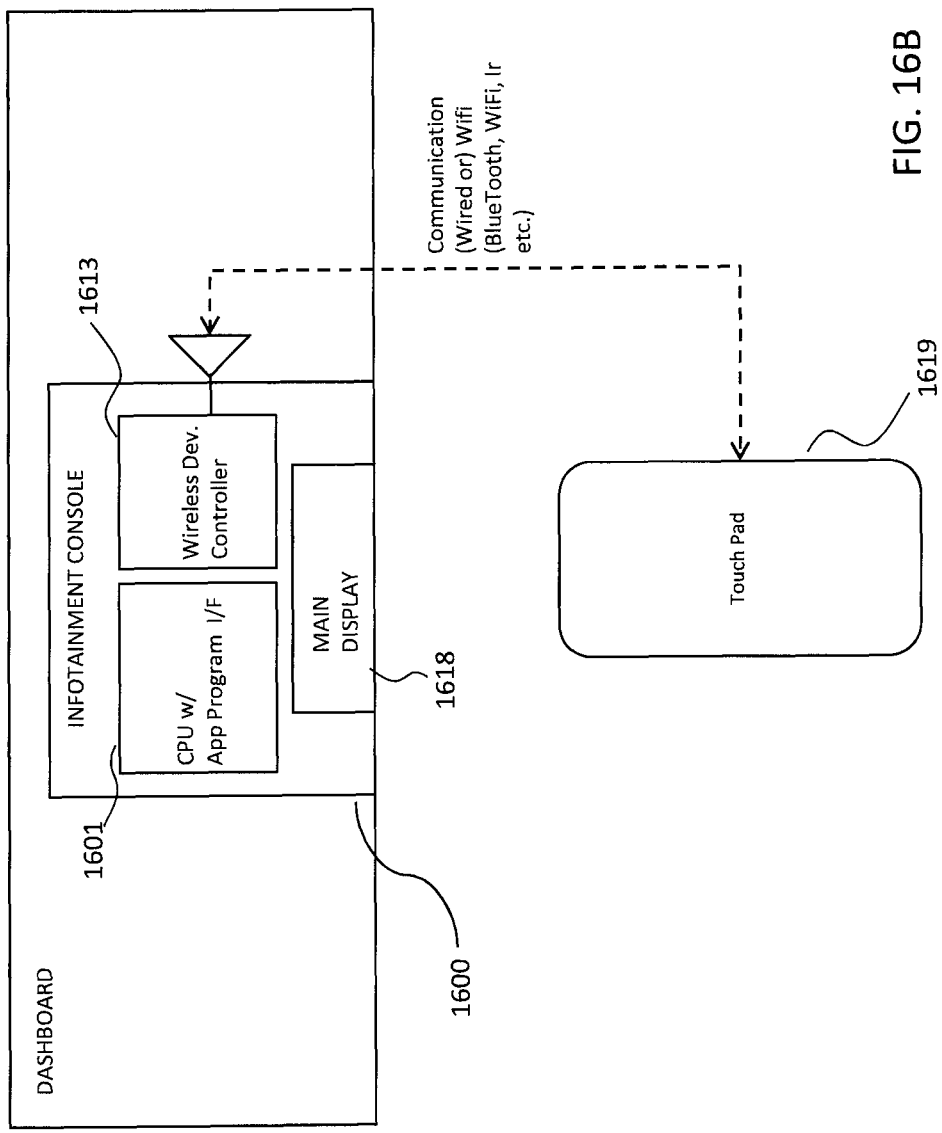
FIG. 16B shows another schematic diagram of an infotainment console in a vehicle and a touch pad having one or more touch sensors therein, which enables receiving text entries on the touch pad, according to one embodiment.

According to one embodiment, in a vehicle, a main display may be incorporated into an infotainment console 1600 and a portable device including a touch screen 1619 such as a touch pad or smartphone may be placed in proximity to the user and an infotainment console 1600 as shown in FIG. 16A. As shown in FIG. 16B, an application program can be executed by a central processor unit 1601 in the infotainment console 1600 for providing service or contents to a user. The application program may receive user entries from the portable device 1619 either wired or wirelessly. In case of receiving such user entries wirelessly, a wireless device controller 1613 communicates with the portable device 1619 using wireless communication, such as radio waves (e.g. Wi-Fi, Bluetooth, etc.), electromagnetic induction (e.g. infrared, NFC, etc.) etc., and an output of the execution of the application program may be displayed on the main display 1618.

Figure 17:
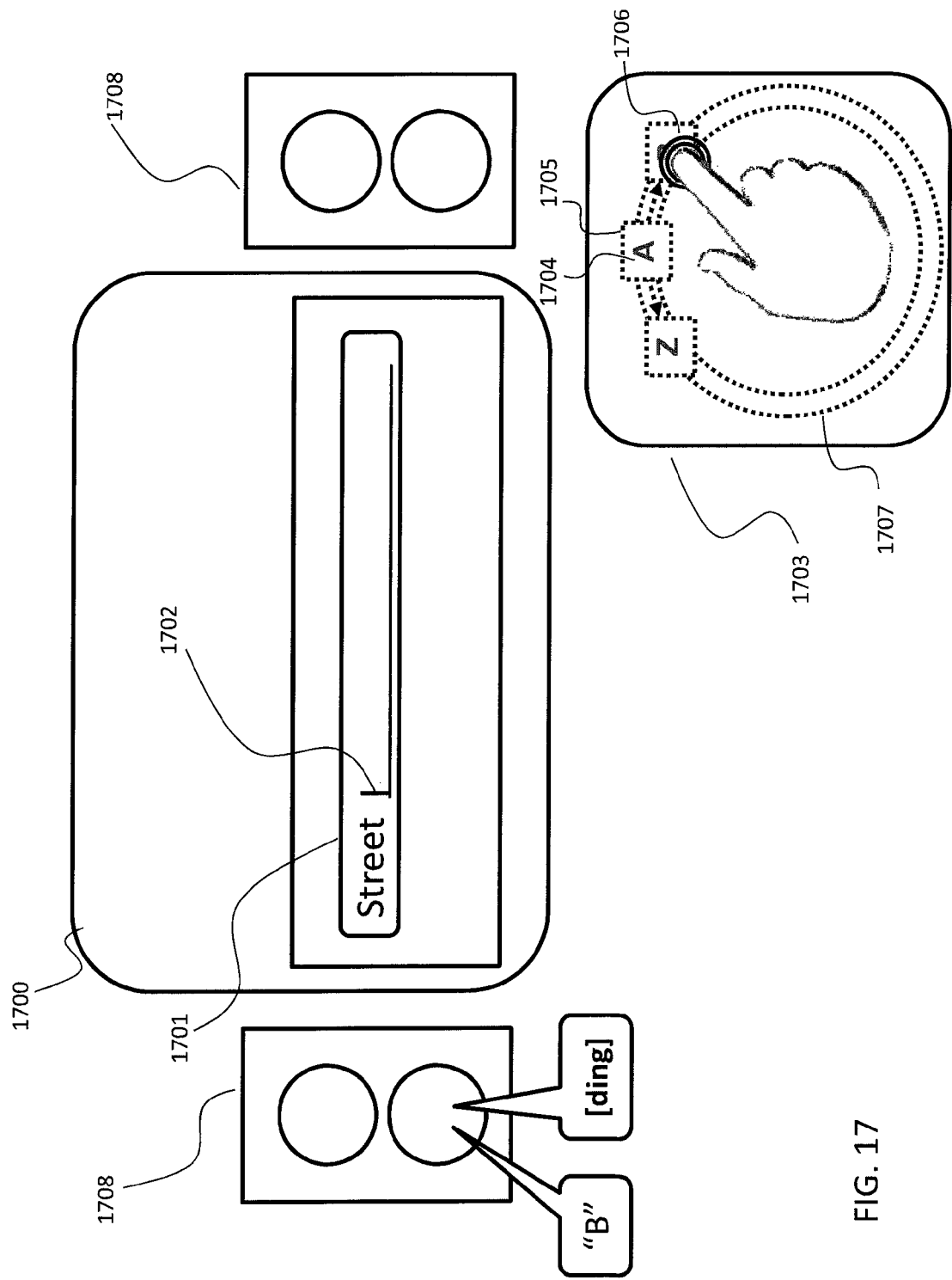
FIG. 17 illustrates an example of a touch pad having a text input slider for inputting a character and a screen displaying a text field for entering one or more text entries by the text input slider.

FIG. 17 shows a screen example illustrating a character input slider for text entries from a touch pad upon touch gesture of a user regarding this embodiment. For example, a screen 1700 is indicating that the user is expected to provide a particular touch gesture for text entry. The screen 1700 displays a text field 1701 for showing a string which is a sequence of characters currently being entered. A cursor or a pointer 1702 may be displayed in the text field 1701 in proximity of a current input location for indicating where a current letter is to be entered. Once a touch pad 1703 senses a contact of an object, such as a finger of the user as a touch gesture on the touch pad 1703, the cursor 1702 is displayed on the screen 1700. A pseudo slider cursor 1706 on a touch pad moves along with a pseudo character input slider 1707 in a direction of movement of the touch gesture when the touch gesture is in a proximity with the at least one slider button and the movement of the touch gesture is along the pseudo character input slider. As shown in FIG. 17, counterclockwise touch gesture while the candidate input character 1704 to be applied corresponding with a pseudo slider button 1705 is "A" may cause a candidate input character change from "A" to "Z" and clockwise touch gesture while the candidate input character 1704 is "A" may cause the a candidate input character change from "A" to "B". The selected candidate input character is entered into the current input location of the text field 1701. Audible sounds may be produced during this process by speaker 1708. If there are several text fields in the screen 1700, the active text input field may be indicated with the cursor 1702. Here, the screen example employed a circular shape for the slider as illustrated in FIG. 5C, however, the slider shape is not limited to the circular shape. Any shape, as shown in FIGS. 5A and 5B or others may provide the same effect of allowing a user to enter alphabets likewise.

Figure 18:
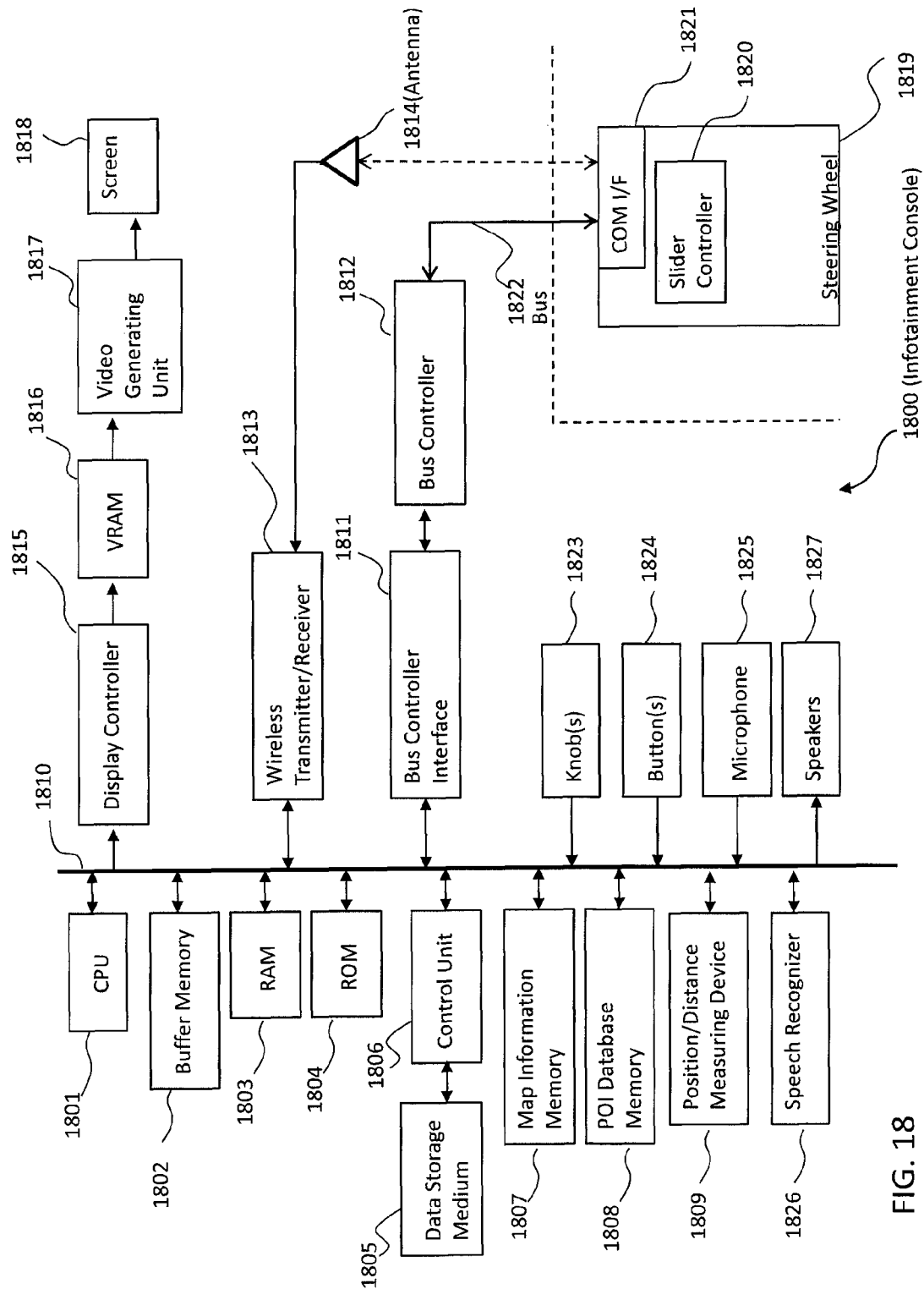
FIG. 18 is a block diagram of an infotainment console in a vehicle and a slider controller on a steering wheel, which enables receiving text entries from the slider controller according to some embodiments.

FIG. 18 is a block diagram of an infotainment console in a vehicle including a display interface device that executes a method and system for entering text with a character input slider under a mobile environment according to another embodiment. Similar to FIG. 15, the vehicle infotainment console 1800 includes a CPU 1801, a buffer memory 1802, RAM 1803, and ROM 1804 for infotainment system control of this disclosure. The CPU 1801 controls an overall operation of the infotainment console 1800 including receiving entries of a user, processing the entries, displaying interaction to the user accordingly, selecting a content or control item from either a medium, a connected device, or a broadcast signal and presenting the content or control item to the user. The infotainment console 1800 also includes a data storage medium 1905 such as a hard disk in a HDD, flash memory in an SSD or USB key memory, a CD-ROM, a DVD or other storage medium for storing navigation and entertainment contents such as map information, music, video etc., a control unit 1806 for controlling an operation for reading the information from the data storage medium 1805, a map information memory 1807, a POI database memory 1808, a position/distance measuring device 1809, etc., and each connected by an internal bus system 1810.

The infotainment console 1800 accommodates a plurality of means for receiving user inputs. For example, the infotainment console 1800 may include a bus controller 1812 for coupling to an external device via an external bus 1822 (e.g. USB, etc.) and a bus controller interface 1811 for handling received data from the external device. In one embodiment, the external bus 1822 may be a vehicle bus used for receiving user inputs from a vehicle proprietary interface such as a steering wheel 1819 that accepts one or more user gesture operations using a slider controller 1820. Here, the slider controller 1820 detects a signal caused by user's slider operation and handles a communication interface 1821 in order to transmit the detected signal to the infotainment console 1800 via the external bus 1822. Alternatively, as seen in a traditional vehicle entertainment system, knobs 1823 and buttons 1824 may be included in the infotainment console 1800 for accommodating entries by a user. To accommodate hands-free input operation to avoid driver distraction, it may be appropriate to use voice commands as user inputs for the infotainment console 1800. To accommodate such voice commands, a microphone 1825 for receiving speech input may be included. Furthermore, the infotainment console 1800 may include a wireless transmitter/receiver 1813 and an antenna 1814, for communication with external devices inside the vehicle, external devices surrounding vehicles, remote servers and networks, etc.

The vehicle infotainment console 1800 may also include a plurality of means to output an interactive result of user input operations. For example, the infotainment console 1800 may include a display controller 1815 for generating images, such as a character input slider for text entries, as well as menu related images related to the infotainment console control information and some of these generated images may be stored in a VRAM 1816. The images stored in the VRAM 1816 are sent to a video generating unit 1817 where the images are converted to an appropriate format to be displayed on a screen 1818. Upon the receipt of video data, the screen 1818 displays the image. Alternatively, to keep eyes of a driving user on a road rather than prompting the driving user to look at the screen, the interactive output may be presented to the driving user as audio feedback via one or more speakers 1827.

Depending on a context, such as whether the infotainment console 1800 is in a navigation mode, entertainment mode, information access mode, control mode, etc., the infotainment console 1800 expects a touch operation as an entry from a user. Here, the user's eyes tend to be on a road ahead and around the vehicle that the user is driving, the user can have very short time to pay attention to the screen 1818 of the infotainment console 1800.

Figure 19A:
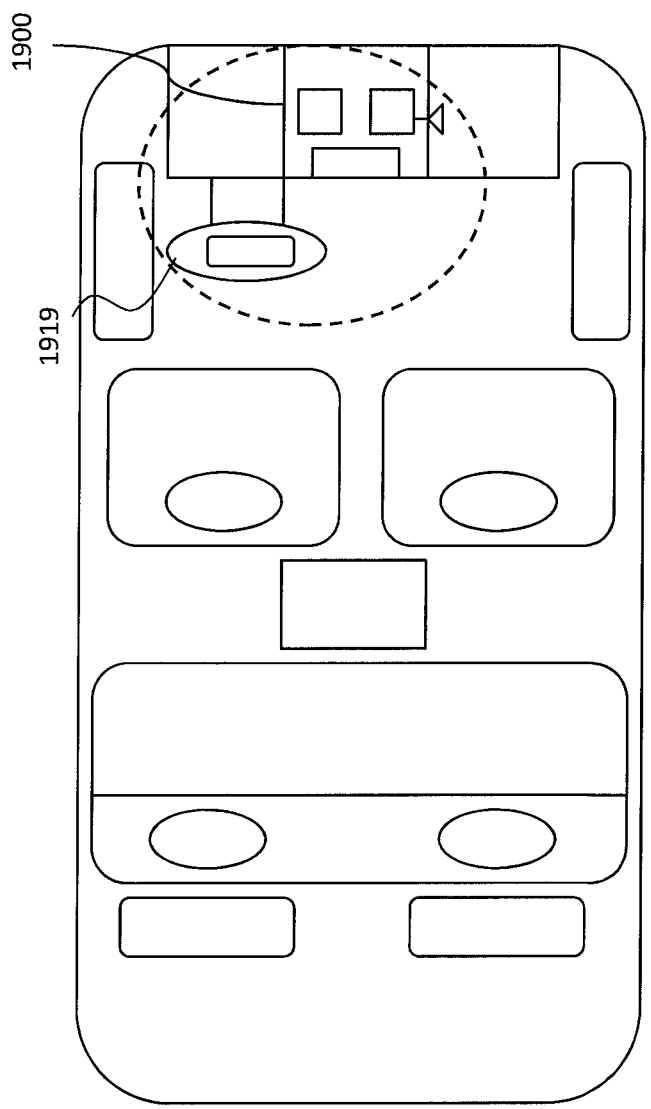
FIG. 19A is a schematic diagram of an infotainment console in a vehicle and a slider controller on a steering wheel, which enables receiving text entries from the slider controller according to some embodiments.
Figure 19B:
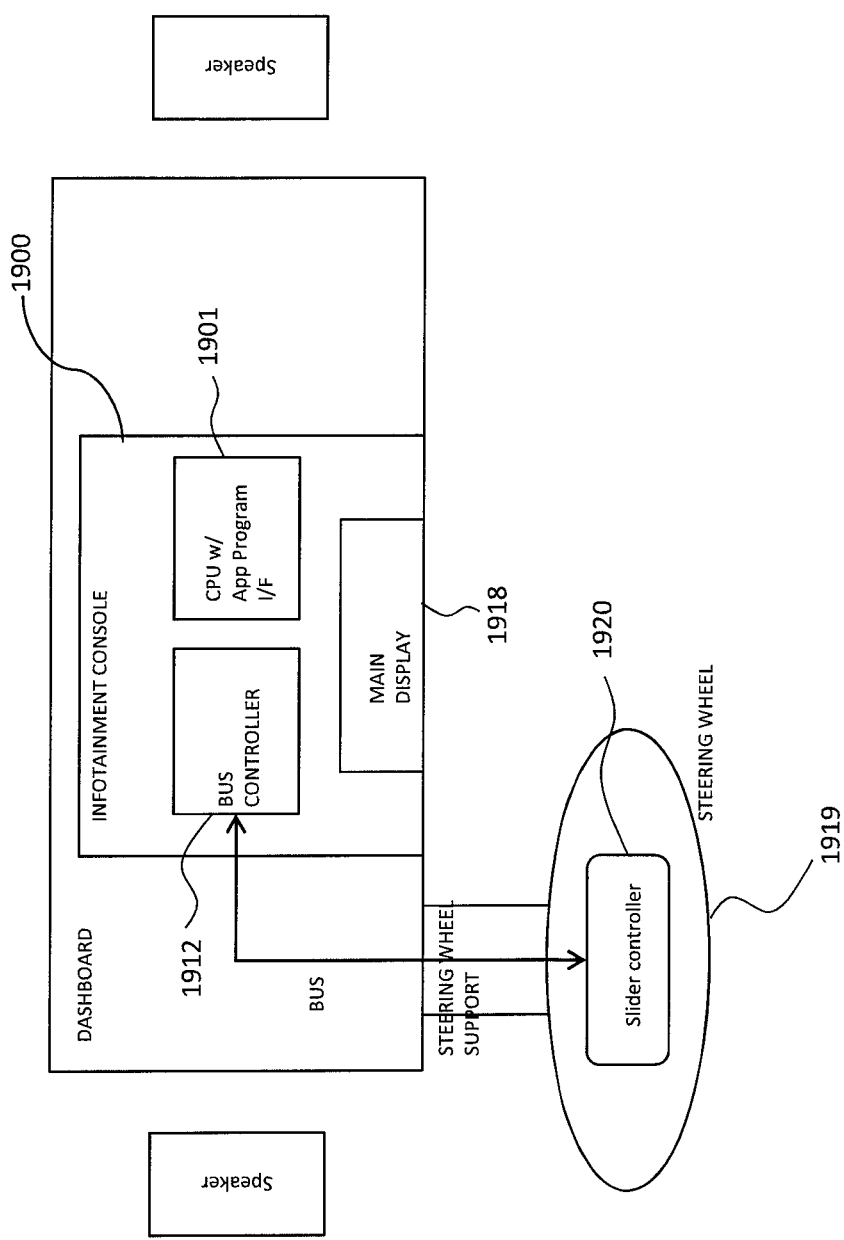
FIG. 19B shows another schematic diagram of an infotainment console in a vehicle and a slider controller on a steering wheel, which enables receiving text entries from the slider controller according to some embodiments.

According to one embodiment, in a vehicle, a main display may be incorporated into an infotainment console 1900 and a steering wheel 1919 including a slider controller may be placed in proximity to the user as shown in FIG. 19A. As shown in FIG. 19B, an application program can be executed by a central processor unit 1901 in the infotainment console 1900 for providing service or contents to a user. The application program may receive user entries from a slide controller 1920 of the steering wheel 1919 either wired or wirelessly. In case of receiving such user entries via a vehicle bus, a bus controller 1912 communicates with the steering wheel 1919 using vehicle bus communication, such as a controller area network (CAN) bus, and an output of the execution of the application program may be displayed on the main display 1918.

Figure 20:
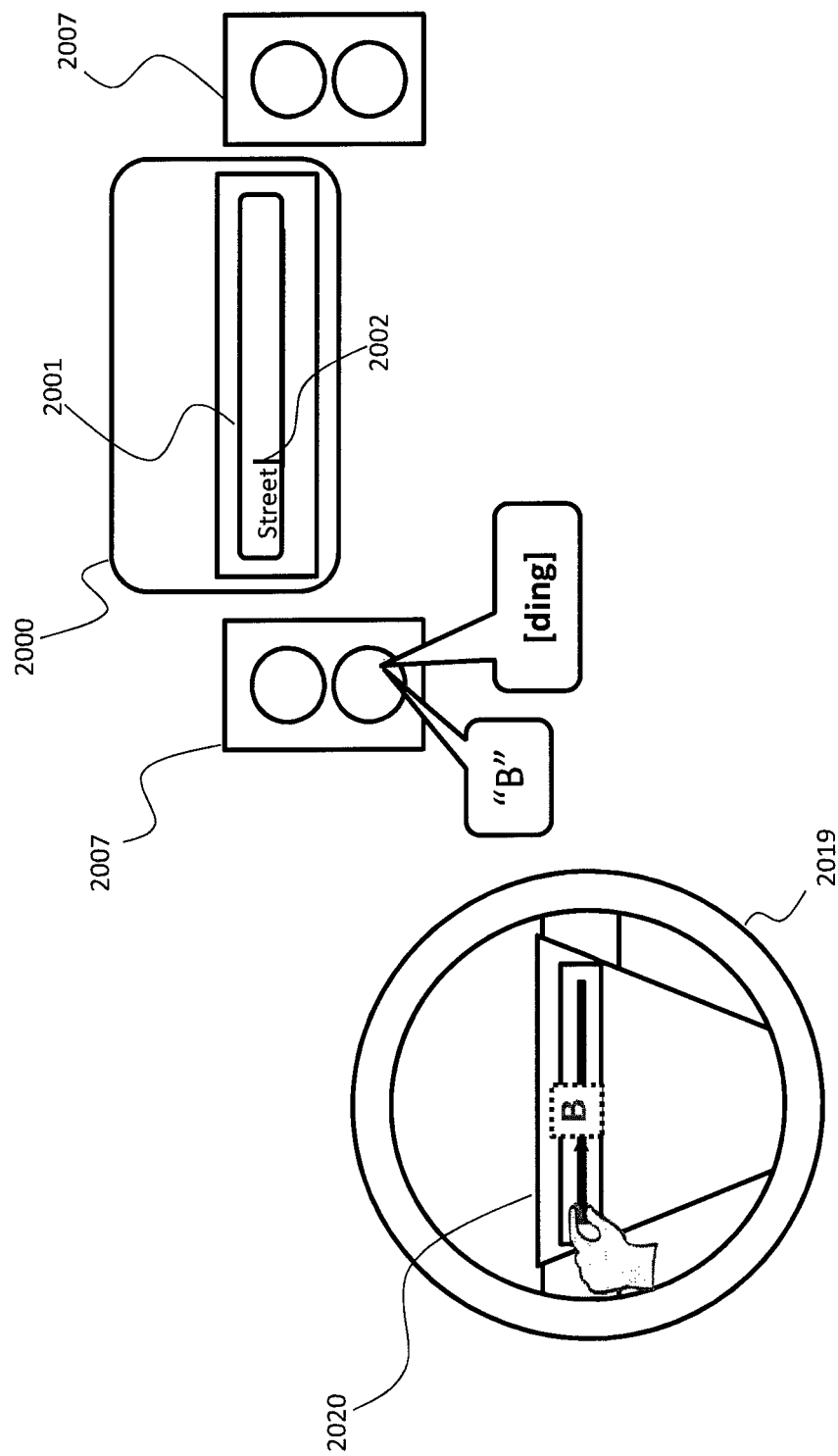
FIG. 20 illustrates an example of a steering wheel having a text input slider for inputting a character and a screen displaying a text field for entering one or more text entries by the text input slider.

FIG. 20 shows a screen example illustrating a physical slider controller for text entries. Here, a mechanical slider controller is shown as an example of the physical slider controller, however, it is not limited to the mechanical slider controller. For example, a screen 2000 is indicating that the user is expected to provide a particular movement of the physical slider controller for text entry. The screen 2000 displays a text field 2001 for showing a string which is a sequence of characters currently being entered. A cursor or a pointer 2002 may be displayed in the text field 2001 in proximity of a current input location for indicating where a current letter is to be entered. On a steering wheel 2019, a physical slider controller 2020 is located. When a user moves a lever of the physical slider controller 2020, a candidate input character changes as previously described for FIG. 4. A predetermined gesture, such as removing the fingers from the physical slider controller 2020 or depressing the physical slider controller 2020, at a certain location may be interpreted as confirmation of the selected input character. Thus, the selected candidate input character can be entered into the current input location of the text field 2001. Audible sounds may be produced during this process by speakers 2007. If there are several text fields in the display 2000, the active text input field may be indicated with the cursor 2002.

Although this invention has been disclosed in the context of certain preferred embodiments and examples, it will be understood by those skilled in the art that the inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that various combination or sub-combination of the specific features and aspects of the embodiments may be made and still fall within the scope of the inventions. It should be understood that various features and aspects of the disclosed embodiments can be combined with or substituted for one another in order to form varying mode of the disclosed invention. Thus, it is intended that the scope of at least some of the present invention herein disclosed should not be limited by the particular disclosed embodiments described above.

The invention claimed is:

1. A method of receiving text entries on a display of an infotainment system, the method comprising:
   providing a character input slider that comprises at least one slider controller;
   sensing a gesture related to moving the at least one slider controller;
   moving the at least one slider controller along the character input slider in a direction of a sensing result when the gesture is in proximity with the at least one slider controller along the character input slider;
   presenting one character when the slider controller is in proximity with a location which corresponds with the one character on the character input slider, the one character being out of a plurality of characters having a plurality of corresponding locations different with each other, respectively on the character input slider;
   focusing the one character when the gesture related to moving the at least one slider controller is not detected for a predetermined period of time;
   selecting the one character when a predetermined gesture other than the gesture related to moving the at least one slider controller along the character input slider is detected after focusing the one character; and
   entering the selected one character into an active location of an active text input field.

2. The method of receiving text entries on the display of the infotainment system of claim 1, wherein the slider controller along the character input slider is located such that the distance between the location of the contact of the object and the character input slider is substantially shortest.

3. The method of receiving text entries on the display of the infotainment system of claim 2, wherein a character distance between one character and the next character increases when the distance between the location of the contact of the object and the character input slider increases.

4. The method of receiving text entries on the display of the infotainment system of claim 1, further comprising a filter-driven mode wherein the one character is a character within a plurality of possible candidate characters based on a matching result between input candidate strings and one or more characters already entered, once a first character is entered.

5. The method of receiving text entries on the display of the infotainment system of claim 4, wherein the matching result is based on either forward-matching or partial-matching.

6. The method of receiving text entries on the display of the infotainment system of claim 1, further comprising:
   providing auditory feedback related to a current location of the slider controller.

7. The method of receiving text entries on the display of the infotainment system of claim 6, wherein the auditory feedback is associated with a character currently selected on the slider.

8. The method of receiving text entries on the display of the infotainment system of claim 6, wherein the auditory feedback is associated with a speed of the movement of the slider controller along the slider.

9. The method of receiving text entries on the display of the infotainment system of claim 1, wherein a shape of the slider is a rectangle having a longer side in a horizontal direction, a rectangle having a longer side in a vertical direction, a circular tube, or a full or partial tube.

10. The method of receiving text entries on the display of the infotainment system of claim 1, wherein the predetermined gesture is removing the object from the slider controller, tapping the slider controller with the object, or pressing the slider controller with the object.

11. The method of receiving text entries on the display of the infotainment system of claim 1,
   wherein receiving text entries is executed at a touch pad comprising a touch sensor configured to sense a contact of an object as a touch gesture on the touch panel and to cause a signal associated with the location of the contact of the object when it is sensed that the object and the touch panel are in contact,
   wherein providing a character input slider is executed by displaying the character input slider on a screen configured to display graphical user interface, and
   wherein presenting the one character is executed by displaying the one character on the screen.

12. The method of receiving text entries on the display of the infotainment system of claim 11,
   wherein the character input slider is provided at a touch pad coupled to the infotainment system coupled to one or more speakers, and
   wherein presenting the one character is executed by playing back a pronunciation of the one character from the one or more speakers.

13. The method of receiving text entries on the display of the infotainment system of claim 11,
   wherein the touch pad is a touch screen comprising the screen,
   wherein providing the character input slider is executed by displaying the character input slider on the touch screen, and
   wherein presenting the one character is executed by either displaying the one character on the display or playing back a pronunciation of the one character from the one more speakers.

14. The method of receiving text entries on the display of the infotainment system of claim 1, wherein the character input slider is a physical controller coupled to the infotainment system, and wherein presenting the one character is executed by either displaying the one character on the display or playing back a pronunciation of the one character from one or more speakers coupled to the infotainment system.

15. A computer system configured to receive text entries, the system comprising:

a screen configured to display graphical user interface;

a touch panel comprising:

a touch sensor configured to sense a contact of an object as a touch gesture on the touch panel and to cause a signal associated with the location of the contact of the object when it is sensed that the object and the touch panel are in contact; and a processor configured to interpret the touch gesture on the touch sensor based on the signal from the touch sensor, wherein the system is configured to provide a character input slider comprising at least one slider controller and at least one slider button configured to move along the character input slider in a direction of movement of the touch gesture when the touch gesture is sensed in proximity with the at least one slider button and the movement of the touch gesture is along the character input slider, to present one character when the slider controller is in a proximity with a location which corresponds with the one character on the character input slider, the one character being out of a plurality of characters having a plurality of corresponding locations different with each other, respectively on the character input slider, to focus the one character when the movement of the touch gesture is not detected for a predetermined period of time, and wherein the processor is configured to detect a predetermined gesture other than the movement of the touch gesture along the character input slider after focusing the one character as a cue for receiving the one character as a text entry and wherein the processor is configured to instruct the screen to display entering the selected one character into an active location of an active text input field.

16. The computer system of receiving text entries of claim 15, wherein the screen and the touch panel are integrally attached to with each other.

17. The computer system of receiving text entries of claim 15, wherein a character distance between one character and next character increases when the distance between the location of the contact of the object and the character input slider increases.

18. The computer system of receiving text entries of claim 15, the system further comprising a filter-driven mode, wherein the one character is a character within a plurality of possible candidate characters based on a matching result between input candidate strings and one or more characters already entered, once a first character is entered.

19. The computer system of receiving text entries of claim 15, further comprising a sound interface wherein the sound interface is configured to provide auditory feedback related to a current location of the slider button.

20. A computer system configured to receive text entries, the system comprising:

a screen configured to display graphical user interface;

a physical character input slider comprising at least one slider controller and at least one slider button thereon configured to move along the character input slider in a direction of movement of a gesture of a user to move the at least one slider button along the character input slider, to present one character when the slider controller is in a proximity with a location which corresponds with the one character on the character input slider, the one character being out of a plurality of characters having a plurality of corresponding locations different with each other, respectively on the character input slider, to focus the one character when the movement of the touch gesture is not detected for a predetermined period of time, and;

a processor configured to interpret the movement of the gesture based on the signal from the physical character input slider; and wherein the processor is configured to detect a predetermined gesture other than the movement of the move gesture along the character input slider after focusing the one character as a cue for receiving the one character as a text entry and wherein the processor is configured to instruct the screen to display entering the selected one character into an active location of an active text input field.

* * * * *